(12) United States Patent
Ren et al.

(10) Patent No.: US 9,176,954 B2
(45) Date of Patent: Nov. 3, 2015

(54) INFORMATION PROCESSING APPARATUS, INFORMATION PROCESSING METHOD, AND NON-TRANSITORY COMPUTER READABLE MEDIUM FOR PRESENTING ASSOCIATED INFORMATION UPON SELECTION OF INFORMATION

(75) Inventors: Beili Ren, Kanagawa (JP); Tohru Fuse, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/369,972

(22) Filed: Feb. 9, 2012

(65) Prior Publication Data
US 2013/0073549 A1  Mar. 21, 2013

(30) Foreign Application Priority Data
Sep. 21, 2011 (JP) .................. 2011-205991

(51) Int. Cl.
G06F 17/21 (2006.01)
G06F 17/30 (2006.01)

(52) U.S. Cl.
CPC ........ G06F 17/30011 (2013.01); G06F 17/211 (2013.01)

(58) Field of Classification Search
CPC ................................ G06F 17/30; G06F 17/00
See application file for complete search history.

(56) References Cited

U.S. PATENT DOCUMENTS

| | | | |
|---|---|---|---|
| 6,615,258 B1 * | 9/2003 | Barry et al. ................... 709/223 |
| 7,003,442 B1 * | 2/2006 | Tsuda ............................. 704/9 |
| 7,228,496 B2 * | 6/2007 | Hamada ........................ 715/255 |
| 7,493,557 B2 * | 2/2009 | Shima ............................ 715/255 |
| 8,103,709 B1 * | 1/2012 | Lee ................................ 707/923 |
| 8,103,710 B1 * | 1/2012 | Lee ................................ 707/930 |
| 8,145,677 B2 * | 3/2012 | Al-Shameri ................... 707/802 |

(Continued)

FOREIGN PATENT DOCUMENTS

| JP | H5-11952 A | 1/1993 |
|---|---|---|
| JP | 2000-010996 A | 1/2000 |

(Continued)

OTHER PUBLICATIONS

Office Action dated Mar. 14, 2013, issued in corresponding Australian Patent Application No. 2012201069.

(Continued)

*Primary Examiner* — Farhan Syed
(74) *Attorney, Agent, or Firm* — Sughrue Mion, PLLC

(57) ABSTRACT

An information processing apparatus includes a presenting unit, an information extracting unit, a characteristics extracting unit, and a limiting unit. The presenting unit presents information. The information extracting unit extracts, in a case where the information presented by the presenting unit is selected, information associated with the selected information from a storing unit that stores plural pieces of information and association between the plural pieces of information. The characteristics extracting unit extracts characteristics relating to the plural pieces of information and the association between the plural pieces of information. The limiting unit limits, in a case where the presenting unit presents the information extracted by the information extracting unit and the number of pieces of information to be presented is greater than or equal to or greater than a predetermined number, information to be presented on the basis of the characteristics extracted by the characteristics extracting unit.

6 Claims, 21 Drawing Sheets

| node | id | time stamp | update_timestamp | | | | | active_count | | | | | | | discetence | | | | | |
|---|---|---|---|---|---|---|---|---|---|---|---|---|---|---|---|---|---|---|---|---|
| | | | (B) | (C) | (D) | (E) | (F) | (G) | (B) | (C) | (D) | (E) | (F) | (G) | (B) | (C) | (D) | (E) | (F) | (G) |
| EVENT | 0 | 00:00 | 00:00 | 00:05 | -- | 00:15 | -- | -- | 0 | 3 | 3 | 4 | 4 | 4 | -1 | 0 | -1 | 0.5 | -1 | 2.5 |
| PROJECT | 1 | 00:00 | 00:00 | -- | -- | -- | 00:20 | 00:25 | 0 | 0 | 0 | 0 | 2 | 3 | -1 | -1 | -1 | -1 | 0 | 0.5 |
| DOCUMENT | 2 | 00:00 | 00:00 | -- | 00:10 | 00:10 | -- | -- | 0 | 0 | 3 | 3 | 3 | 3 | -1 | -1 | 0 | 2 | -1 | 2 |
| Kick off | 3 | 00:05 | none | 00:05 | -- | 00:15 | -- | -- | 0 | 1 | 1 | 4 | 4 | 4 | -1 | 1 | -1 | 0 | -1 | 2 |
| WEEKLY REPORT MEETING | 4 | 00:05 | none | 00:05 | -- | -- | -- | -- | 0 | 1 | 1 | 1 | 1 | 1 | -1 | 1 | -1 | 1.5 | -1 | 3.5 |
| REGULAR MEETING | 5 | 00:05 | none | 00:05 | -- | -- | -- | -- | 0 | 1 | 1 | 1 | 1 | 1 | -1 | 1 | -1 | 1.5 | -1 | 3.5 |
| STRATEGY REPORT | 6 | 00:10 | none | none | 00:10 | 00:15 | -- | 00:25 | 0 | 0 | 1 | 2 | 2 | 3 | -1 | -1 | 1 | 1 | -1 | 1 |
| report | 7 | 00:10 | none | none | 00:10 | 00:15 | -- | -- | 0 | 0 | 1 | 2 | 2 | 2 | -1 | -1 | 1 | 1 | -1 | 3 |
| WEEKLY REPORT | 8 | 00:10 | none | none | 00:10 | -- | -- | -- | 0 | 0 | 1 | 1 | 1 | 1 | -1 | -1 | 1 | 3 | -1 | 3 |
| T1 | 9 | 00:20 | none | none | none | none | 00:20 | 00:25 | 0 | 0 | 0 | 0 | 1 | 1 | -1 | -1 | -1 | -1 | 1 | 1.5 |
| T2 | 10 | 00:20 | none | none | none | none | 00:20 | -- | 0 | 0 | 0 | 0 | 1 | 3 | -1 | -1 | -1 | -1 | 1 | 0 |

(56) References Cited

U.S. PATENT DOCUMENTS

| | | | |
|---|---|---|---|
| 8,271,563 B1* | 9/2012 | Lee | 707/923 |
| 8,332,738 B2* | 12/2012 | Lo et al. | 715/200 |
| 8,780,130 B2* | 7/2014 | Morris | 345/581 |
| 9,026,907 B2* | 5/2015 | Lum | 715/275 |
| 2003/0050927 A1* | 3/2003 | Hussam | 707/5 |
| 2004/0010755 A1* | 1/2004 | Hamada | 715/513 |
| 2004/0148278 A1* | 7/2004 | Milo et al. | 707/3 |
| 2004/0237043 A1* | 11/2004 | Shima | 715/530 |
| 2006/0036615 A1 | 2/2006 | Masselle et al. | |
| 2007/0192716 A1* | 8/2007 | Hamada | 715/764 |
| 2008/0027933 A1* | 1/2008 | Hussam | 707/6 |
| 2008/0028308 A1* | 1/2008 | Brownlee et al. | 715/275 |
| 2008/0168135 A1* | 7/2008 | Redlich et al. | 709/204 |
| 2009/0112844 A1* | 4/2009 | Oro | 707/5 |
| 2009/0254572 A1* | 10/2009 | Redlich et al. | 707/10 |
| 2009/0327277 A1* | 12/2009 | Sanborn et al. | 707/5 |
| 2010/0010968 A1* | 1/2010 | Redlich et al. | 707/3 |
| 2010/0011410 A1* | 1/2010 | Liu | 726/1 |
| 2010/0223276 A1* | 9/2010 | Al-Shameri et al. | 707/769 |
| 2010/0250497 A1* | 9/2010 | Redlich et al. | 707/661 |
| 2011/0119262 A1* | 5/2011 | Dexter et al. | 707/726 |
| 2011/0119633 A1 | 5/2011 | Mishima et al. | |
| 2012/0117116 A1* | 5/2012 | Jacobson et al. | 707/792 |
| 2012/0117120 A1* | 5/2012 | Jacobson et al. | 707/793 |
| 2013/0198233 A1* | 8/2013 | Jacobson et al. | 707/774 |
| 2013/0246437 A1* | 9/2013 | Jacobson et al. | 707/741 |

FOREIGN PATENT DOCUMENTS

| | | |
|---|---|---|
| JP | 2004-192355 A | 7/2004 |
| JP | 2009-25933 A | 2/2009 |
| JP | 2011-107855 A | 6/2011 |

OTHER PUBLICATIONS

Australian Office Action dated Sep. 27, 2013, issued in corresponding Patent Application No. 2012-201069.

Notification of Reason for Refusal dated Mar. 17, 2015, issued by the Japanese Patent Office in counterpart Japanese application No. 2011-205991.

* cited by examiner

TIME 00:00

| node | id | timestamp | update_timestamp | active_count | out_edge | in_edge | disctence |
|---|---|---|---|---|---|---|---|
| EVENT | 0 | 00:00 | 00:00 | 0 | null | null | -1 |
| PROJECT | 1 | 00:00 | 00:00 | 0 | null | null | -1 |
| DOCUMENT | 2 | 00:00 | 00:00 | 0 | null | null | -1 |

TIME 00:05

| node | id | timestamp | update_timestamp | active_count | out_edge | in_edge | disctence |
|---|---|---|---|---|---|---|---|
| EVENT | 0 | 00:00 | 00:05 | 3 | e0 e1 e2 | null | 0 |
| PROJECT | 1 | 00:00 | 00:00 | 0 | null | null | −1 |
| DOCUMENT | 2 | 00:00 | 00:00 | 0 | null | null | −1 |
| Kick off | 3 | 00:05 | 00:05 | 1 | null | e0 | 1 |
| WEEKLY REPORT MEETING | 4 | 00:05 | 00:05 | 1 | null | e1 | 1 |
| REGULAR MEETING | 5 | 00:05 | 00:05 | 1 | null | e2 | 1 |

| edge id | active-timestamp | update_active_timestamp | active_count |
|---|---|---|---|
| e0 | 00:05 | 00:05 | 1 |
| e1 | 00:05 | 00:05 | 1 |
| e2 | 00:05 | 00:05 | 1 |

TIME 00:10

| node | id | timestamp | update_timestamp | active_count | out_edge | in_edge | disctence |
|---|---|---|---|---|---|---|---|
| EVENT | 0 | 00:00 | 00:05 | 3 | e0 e1 e2 | null | −1 |
| PROJECT | 1 | 00:00 | 00:00 | 0 | null | null | −1 |
| DOCUMENT | 2 | 00:00 | 00:10 | 3 | e3 e4 e5 | null | 0 |
| Kick off | 3 | 00:05 | 00:05 | 1 | null | e0 | −1 |
| WEEKLY REPORT MEETING | 4 | 00:05 | 00:05 | 1 | null | e1 | −1 |
| REGULAR MEETING | 5 | 00:05 | 00:05 | 1 | null | e2 | −1 |
| STRATEGY REPORT | 6 | 00:10 | 00:10 | 1 | null | e3 | 1 |
| Report | 7 | 00:10 | 00:10 | 1 | null | e4 | 1 |
| WEEKLY REPORT | 8 | 00:10 | 00:10 | 1 | null | e5 | 1 |

| edge id | active-timestamp | update_active_timestamp | active_count |
|---|---|---|---|
| e0 | 00:05 | 00:05 | 1 |
| e1 | 00:05 | 00:05 | 1 |
| e2 | 00:05 | 00:05 | 1 |
| e3 | 00:10 | 00:10 | 1 |
| e4 | 00:10 | 00:10 | 1 |
| e5 | 00:10 | 00:10 | 1 |

TIME 00:15

| node | id | timestamp | update_timestamp | active_count | out_edge | in_edge | disctence |
|---|---|---|---|---|---|---|---|
| EVENT | 0 | 00:00 | 00:15 | 4 | e0 e1 e2 | null | 0.5 |
| PROJECT | 1 | 00:00 | 00:00 | 0 | null | null | −1 |
| DOCUMENT | 2 | 00:00 | 00:10 | 3 | e3 e4 e5 | null | 2 |
| Kick off | 3 | 00:05 | 00:15 | 4 | e6 e7 | e0 | 0 |
| WEEKLY REPORT MEETING | 4 | 00:05 | 00:05 | 1 | null | e1 | 1.5 |
| REGULAR MEETING | 5 | 00:05 | 00:05 | 1 | null | e2 | 1.5 |
| STRATEGY REPORT | 6 | 00:10 | 00:15 | 2 | null | e3 e6 | 1 |
| Report | 7 | 00:10 | 00:15 | 2 | null | e4 e7 | 1 |
| WEEKLY REPORT | 8 | 00:10 | 00:10 | 1 | null | e5 | 3 |

| edge id | active-timestamp | update_active_timestamp | active_count |
|---------|------------------|-------------------------|--------------|
| e0 | 00:05 | 00:15 | 2 |
| e1 | 00:05 | 00:05 | 1 |
| e2 | 00:05 | 00:05 | 1 |
| e3 | 00:10 | 00:10 | 1 |
| e4 | 00:10 | 00:10 | 1 |
| e5 | 00:10 | 00:10 | 1 |
| e6 | 00:15 | 00:15 | 1 |
| e7 | 00:15 | 00:15 | 1 |

TIME 00:20

| node | id | timestamp | update_timestamp | active_count | out_edge | in_edge | disctence |
|---|---|---|---|---|---|---|---|
| EVENT | 0 | 00:00 | 00:15 | 4 | e0 e1 e2 | null | −1 |
| PROJECT | 1 | 00:00 | 00:20 | 2 | e8 e9 | null | 0 |
| DOCUMENT | 2 | 00:00 | 00:10 | 3 | e3 e4 e5 | null | −1 |
| Kick off | 3 | 00:05 | 00:15 | 4 | e6 e7 | e0 | −1 |
| WEEKLY REPORT MEETING | 4 | 00:05 | 00:05 | 1 | null | e1 | −1 |
| REGULAR MEETING | 5 | 00:05 | 00:05 | 1 | null | e2 | −1 |
| STRATEGY REPORT | 6 | 00:10 | 00:15 | 2 | null | e3 e6 | −1 |
| Report | 7 | 00:10 | 00:15 | 2 | null | e4 e7 | −1 |
| WEEKLY REPORT | 8 | 00:10 | 00:10 | 1 | null | e5 | −1 |
| T1 | 9 | 00:20 | 00:20 | 1 | null | e8 | 1 |
| T2 | 10 | 00:20 | 00:25 | 1 | null | e9 | 1 |

| edge id | active-timestamp | update_active_timestamp | active_count |
|---|---|---|---|
| e0 | 00:05 | 00:15 | 2 |
| e1 | 00:05 | 00:05 | 1 |
| e2 | 00:05 | 00:05 | 1 |
| e3 | 00:10 | 00:10 | 1 |
| e4 | 00:10 | 00:10 | 1 |
| e5 | 00:10 | 00:10 | 1 |
| e6 | 00:15 | 00:15 | 1 |
| e7 | 00:15 | 00:15 | 1 |
| e8 | 00:20 | 00:20 | 1 |
| e9 | 00:20 | 00:20 | 1 |

TIME 00:25

| node | id | timestamp | update_timestamp | active_count | out_edge | in_edge | disctence |
|---|---|---|---|---|---|---|---|
| EVENT | 0 | 00:00 | 00:15 | 4 | e0 e1 e2 | null | 2.5 |
| PROJECT | 1 | 00:00 | 00:25 | 3 | e8 e9 | null | 0.5 |
| DOCUMENT | 2 | 00:00 | 00:10 | 3 | e3 e4 e5 | null | 2 |
| Kick off | 3 | 00:05 | 00:15 | 4 | e6 e7 | e0 | 2 |
| WEEKLY REPORT MEETING | 4 | 00:05 | 00:05 | 1 | null | e1 | 3.5 |
| REGULAR MEETING | 5 | 00:05 | 00:05 | 1 | null | e2 | 3.5 |
| STRATEGY REPORT | 6 | 00:10 | 00:25 | 3 | null | e3 e6 | 1 |
| Report | 7 | 00:10 | 00:15 | 2 | null | e4 e7 | 3 |
| WEEKLY REPORT | 8 | 00:10 | 00:10 | 1 | null | e5 | 3 |
| T1 | 9 | 00:20 | 00:20 | 1 | null | e8 | 1.5 |
| T2 | 10 | 00:20 | 00:25 | 3 | e10 | e9 | 0 |

FIG. 27

| edge id | active-timestamp | update_active_timestamp | active_count |
|---|---|---|---|
| e0 | 00:05 | 00:15 | 2 |
| e1 | 00:05 | 00:05 | 1 |
| e2 | 00:05 | 00:05 | 1 |
| e3 | 00:10 | 00:10 | 1 |
| e4 | 00:10 | 00:10 | 1 |
| e5 | 00:10 | 00:10 | 1 |
| e6 | 00:15 | 00:15 | 1 |
| e7 | 00:15 | 00:15 | 1 |
| e8 | 00:20 | 00:20 | 1 |
| e9 | 00:20 | 00:25 | 2 |
| e10 | 00:25 | 00:25 | 1 |

FIG. 28

| node | id | time stamp | update_timestamp | | | | | | active_count | | | | | | distence | | | | | |
|---|---|---|---|---|---|---|---|---|---|---|---|---|---|---|---|---|---|---|---|---|
| | | | (B) | (C) | (D) | (E) | (F) | (G) | (B) | (C) | (D) | (E) | (F) | (G) | (B) | (C) | (D) | (E) | (F) | (G) |
| EVENT | 0 | 00:00 | 00:00 | 00:05 | -- | 00:15 | -- | -- | 0 | 3 | 3 | 4 | 4 | 4 | -1 | 0 | -1 | 0.5 | -1 | 2.5 |
| PROJECT | 1 | 00:00 | 00:00 | -- | -- | -- | 00:20 | 00:25 | 0 | 0 | 0 | 0 | 2 | 3 | -1 | -1 | -1 | -1 | 0 | 0.5 |
| DOCUMENT | 2 | 00:00 | 00:00 | -- | 00:10 | 00:10 | -- | -- | 0 | 0 | 3 | 3 | 3 | 3 | -1 | -1 | 0 | 2 | -1 | 2 |
| Kick off | 3 | 00:05 | none | 00:05 | -- | 00:15 | -- | -- | 0 | 1 | 1 | 4 | 4 | 4 | -1 | 1 | -1 | 0 | -1 | 2 |
| WEEKLY REPORT MEETING | 4 | 00:05 | none | 00:05 | -- | -- | -- | -- | 0 | 1 | 1 | 1 | 1 | 1 | -1 | 1 | -1 | 1.5 | -1 | 3.5 |
| REGULAR MEETING | 5 | 00:05 | none | 00:05 | -- | -- | -- | -- | 0 | 1 | 1 | 1 | 1 | 1 | -1 | 1 | -1 | 1.5 | -1 | 3.5 |
| STRATEGY REPORT | 6 | 00:10 | none | none | 00:10 | 00:15 | -- | 00:25 | 0 | 0 | 1 | 2 | 2 | 3 | -1 | -1 | 1 | 1 | -1 | 1 |
| report | 7 | 00:10 | none | none | 00:10 | 00:15 | -- | -- | 0 | 0 | 1 | 2 | 2 | 2 | -1 | -1 | 1 | 1 | -1 | 3 |
| WEEKLY REPORT | 8 | 00:10 | none | none | 00:10 | -- | -- | -- | 0 | 0 | 0 | 1 | 1 | 1 | -1 | -1 | 1 | 1 | -1 | 3 |
| T1 | 9 | 00:20 | none | none | none | none | 00:20 | -- | 0 | 0 | 0 | 0 | 1 | 1 | -1 | -1 | -1 | 3 | 1 | 1.5 |
| T2 | 10 | 00:20 | none | none | none | none | 00:20 | -- | 0 | 0 | 0 | 0 | 1 | 3 | -1 | -1 | -1 | -1 | 1 | 0 |

INFORMATION PROCESSING APPARATUS, INFORMATION PROCESSING METHOD, AND NON-TRANSITORY COMPUTER READABLE MEDIUM FOR PRESENTING ASSOCIATED INFORMATION UPON SELECTION OF INFORMATION

CROSS-REFERENCE TO RELATED APPLICATIONS

This application is based on and claims priority under 35 USC 119 from Japanese Patent Application No. 2011-205991 filed Sep. 21, 2011.

BACKGROUND (i) Technical Field

The present invention relates to an information processing apparatus, an information processing method, and a non-transitory computer readable medium.

(ii) Related Art

Techniques relating to information search are available.

SUMMARY

According to an aspect of the invention, there is provided an information processing apparatus including a presenting unit, an information extracting unit, a characteristics extracting unit, and a limiting unit. The presenting unit presents information. The information extracting unit extracts, in a case where the information presented by the presenting unit is selected, information associated with the selected information from a storing unit that stores plural pieces of information and association between the plural pieces of information. The characteristics extracting unit extracts characteristics relating to the plural pieces of information and the association between the plural pieces of information. The limiting unit limits, in a case where the presenting unit presents the information extracted by the information extracting unit and the number of pieces of information to be presented is greater than or equal to or greater than a predetermined number, information to be presented on the basis of the characteristics extracted by the characteristics extracting unit.

BRIEF DESCRIPTION OF THE DRAWINGS

Exemplary embodiments of the present invention will be described in detail based on the following figures, wherein:

FIG. 17 is an explanatory diagram illustrating an example of the data structure of a node data table;

FIG. 18 is an explanatory diagram illustrating an example of the data structure of an edge data table;

FIG. 27 is an explanatory diagram illustrating an example of the data structure of an edge data table;

FIG. 28 is an explanatory diagram illustrating an example of the transition of node data;

DETAILED DESCRIPTION

Hereinafter, exemplary embodiments of the invention will be explained below with reference to the drawings.

Figure 1:
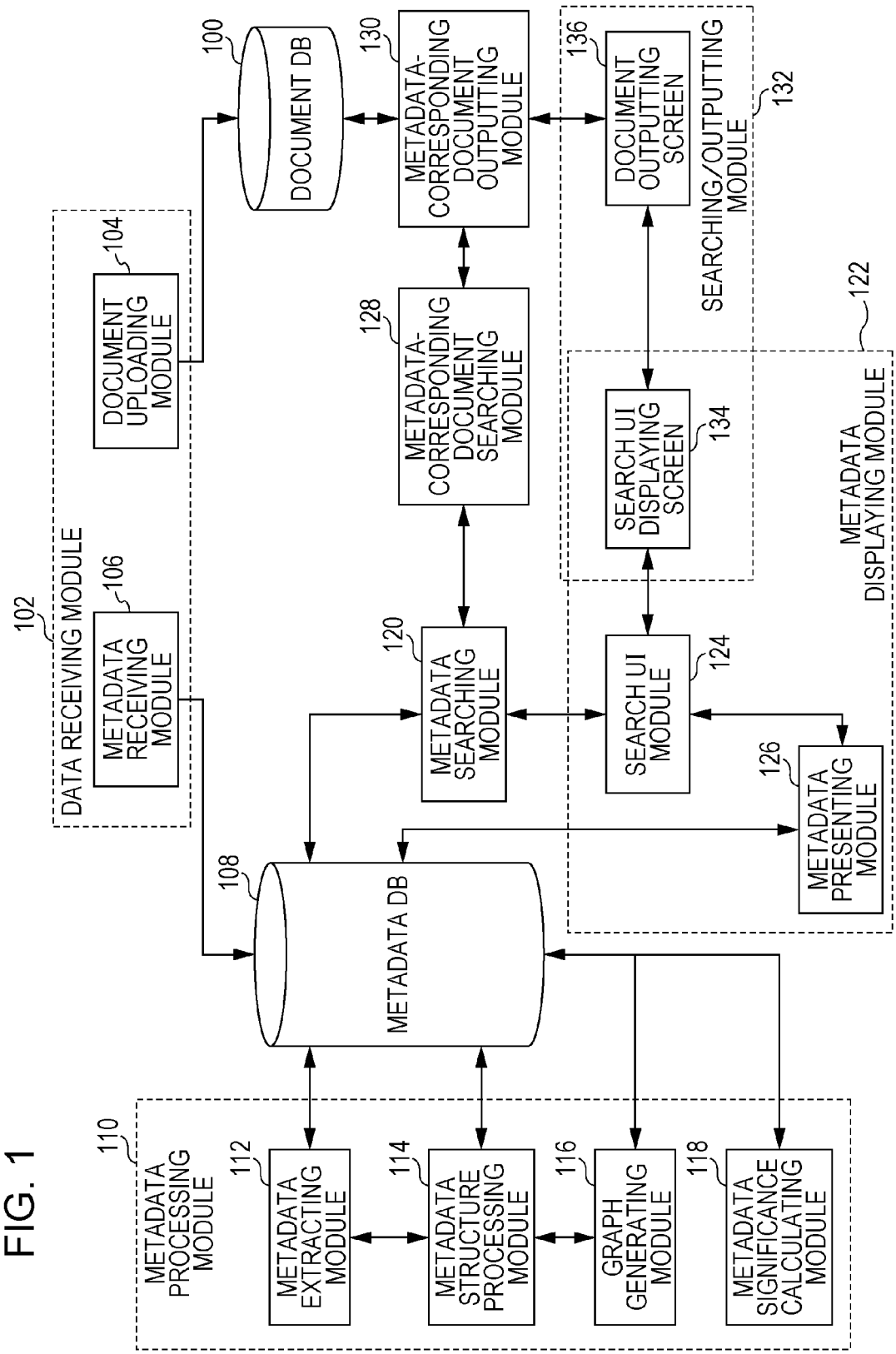
FIG. 1 is a schematic diagram illustrating an example of the module configuration according to an exemplary embodiment.

FIG. 1 is a schematic diagram illustrating an example of the module configuration according to an exemplary embodiment.

The term "module" generally represents a component such as software (a computer program), hardware, or the like, which can be logically separated. Thus, modules in exemplary embodiments represent modules in a hardware configuration as well as modules in a computer program. Therefore, the exemplary embodiments also provide explanations of computer programs for causing the components to function as modules (including a program causing a computer to execute various procedures, a program causing a computer to function as various units, and a program causing a computer to implement various functions), systems, and methods. For the sake of a clear explanation, the terms "store" and "cause something to store" and other equivalent expressions are used. In a case where an exemplary embodiment concerns a computer program, these terms and expressions mean "causing a storing device to store" or "controlling a storing device to store".

In addition, a module may correspond to a function in a one-to-one relationship. However, for implementation, a single module may be implemented by a single program, plural modules may be implemented by a single program, or a single module may be implemented by plural programs. Furthermore, plural modules may be executed by a single computer or a single module may be executed by plural computers in a distributed or parallel environment. One module may include another module. Hereinafter, the term "connection" means logical connection (exchange of data, instruction, cross-reference between data, and the like) as well as physical connection. The term "predetermined" means set before a target process is performed. Being "predetermined" means not only being set before processing in an exemplary embodiment starts but also being set even after the processing in the exemplary embodiment starts, in accordance with the condition and state at that time or in accordance with the condition and state of a period until that time, as long as before the target process is performed.

A "system" or an "apparatus" may be implemented by a single computer, hardware, apparatus, or the like as well as by plural computers, hardware, apparatuses, or the like connected using a communication unit such as a network (including communication connection in a one-to-one correspondence). The term "apparatus" is used as a synonym for the term "system". Obviously, the term "system" does not include merely a social "mechanism" (social system), which is an artificial arrangement.

For each process in a module or for individual processes in a module performing plural processes, target information is read from a storing device and the result of the process is written to the storing device after the process is performed. Thus, the explanation of reading from the storing device before the process is performed or the explanation of writing to the storing device after the process is performed may be omitted. The storing device may be a hard disk, a random-access memory (RAM), an external storage medium, a storing device using a communication line, a register inside a central processing unit (CPU), or the like. In addition, the description meaning that "in the case of A, B is performed" means that "it is determined whether it is A, and if it is determined that it is A, B is performed". However, this is not applied to a case where it is not necessary to make a determination as to whether it is A.

An information processing apparatus according to an exemplary embodiment presents plural pieces of metadata and the association between the plural pieces of metadata. As illustrated in the example of FIG. 1, the information processing apparatus includes a document DB 100, a data receiving module 102, a metadata DB 108, a metadata processing module 110, a metadata searching module 120, a metadata displaying module 122, a metadata-corresponding document searching module 128, a metadata-corresponding document outputting module 130, and a searching/outputting module 132.

The data receiving module 102 includes a document uploading module 104 and a metadata receiving module 106.

The document uploading module 104 is connected to the document DB 100. The document uploading module 104 causes the document DB 100 to store a document (electronic document).

The metadata receiving module 106 is connected to the metadata DB 108. The metadata receiving module 106 receives metadata, and causes the metadata DB 108 to store the metadata. In this exemplary embodiment, the metadata is information to be presented. When the document uploading module 104 causes the document DB 100 to store a document, the metadata receiving module 106 may register metadata of the document into the metadata DB 108. The metadata may be information irrelevant to a document (for example, associated information such as an event, a project, or the like), as well as the name, attribute, and the like of the document. Furthermore, the metadata receiving module 106 may generate metadata on the basis of a document stored in the document DB 100, for example, by using the technique disclosed in Japanese Unexamined Patent Application Publication No. 2000-010996.

The document DB 100 is connected to the document uploading module 104 and the metadata-corresponding document outputting module 130. The document DB 100 is a database that stores a document.

The metadata DB 108 is connected to the metadata receiving module 106, a metadata extracting module 112, a metadata structure processing module 114, a graph generating module 116, a metadata significance calculating module 118, a metadata searching module 120, and a metadata presenting module 126. The metadata DB 108 is a database that stores plural pieces of metadata and the association between the plural pieces of metadata.

Figure 7:
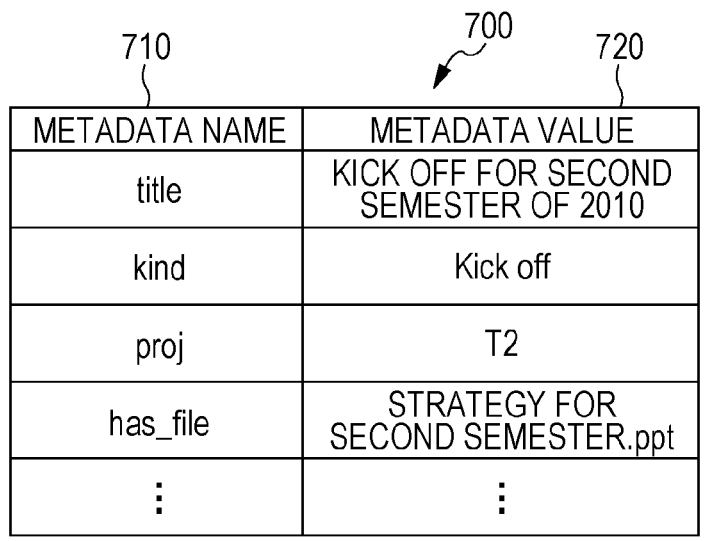
FIG. 7 is an explanatory diagram illustrating an example of the data structure of an event metadata registration table.
Figure 8:
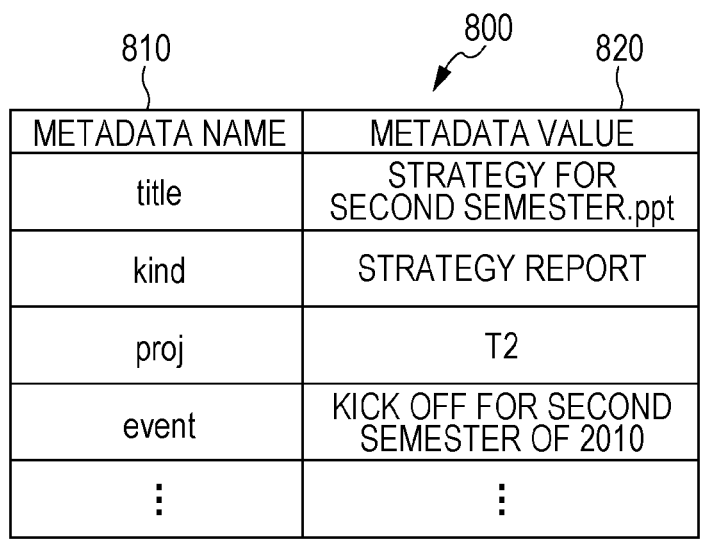
FIG. 8 is an explanatory diagram illustrating an example of the data structure of a document metadata registration table.
Figure 9:
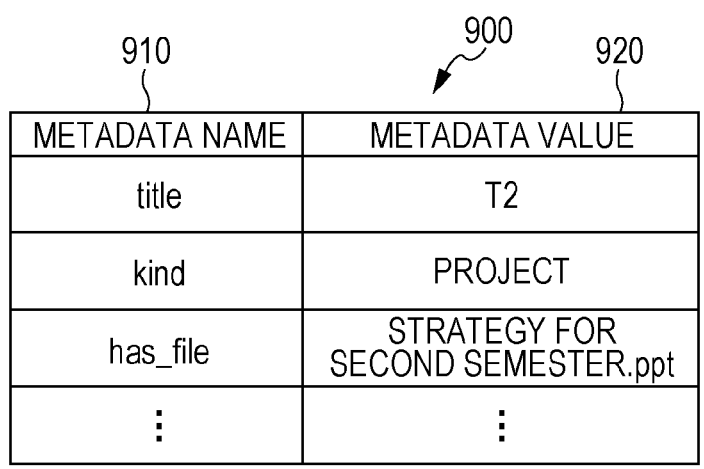
FIG. 9 is an explanatory diagram illustrating an example of the data structure of a project metadata registration table.

The metadata to be stored in the metadata DB 108 includes, for example, an event metadata registration table 700, a document metadata registration table 800, and a project metadata registration table 900. FIGS. 7, 8, and 9 are explanatory diagrams illustrating examples of the data structures of the event metadata registration table 700, the document metadata registration table 800, and the project metadata registration table 900, respectively. The event metadata registration table 700 contains a metadata name field 710 and a metadata value field 720. The metadata name field 710 stores the names of attributes. The metadata value field 720 stores the values of the individual attributes. The document metadata registration table 800 contains a metadata name field and a metadata value field 820. The metadata name field 810 stores the names of attributes. The metadata value field 820 stores the values of the individual attributes. The project metadata registration table 900 contains a metadata name field 910 and a metadata value field 920. The metadata name field 910 stores the names of attributes. The metadata value field 920 stores the values of the individual attributes.

For example, information in the metadata value field 720 for "title" in the metadata name field 710 may be extracted as metadata to be presented. The same applies to the document metadata registration table 800 and the project metadata registration table 900.

Figure 6:
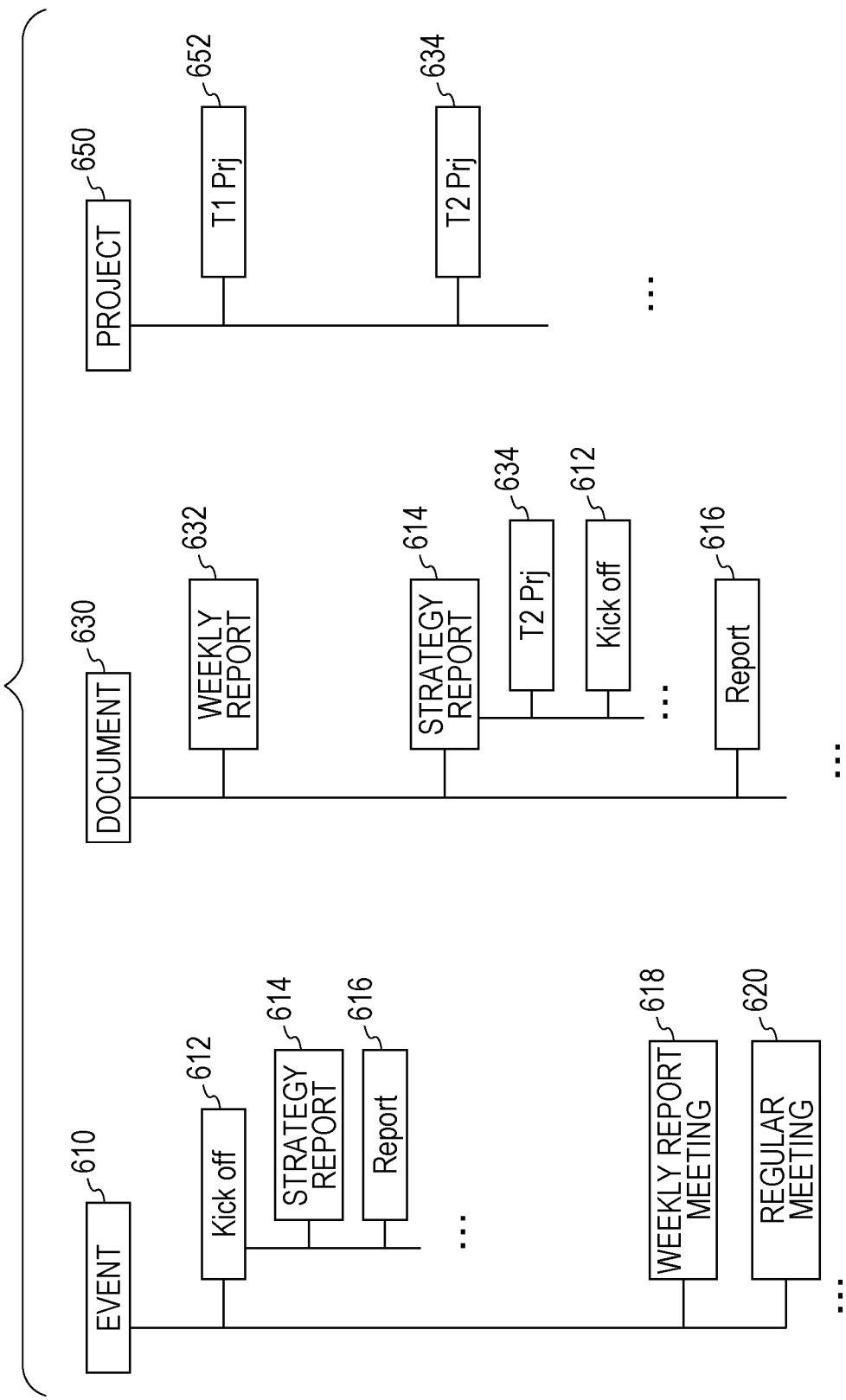
FIG. 6 is an explanatory diagram illustrating an example of the association between plural pieces of metadata.

Directory structures (tree structures) illustrated in FIG. 6 are examples of the association between plural pieces of metadata stored in the metadata DB 108. These examples illustrate three directory structures of an event, a document, and a project. In the first directory structure, a kick off 612, a weekly report meeting 618, and a regular meeting 620 are provided at a level lower than an event 610. A strategy report 614 and a report 616 are provided at a level lower than the kick off 612. In the second directory structure, a weekly report 632, the strategy report 614, and the report 616 are provided at a level lower than a document 630. A T2 Prj 634 and the kick off 612 are provided at a level lower than the strategy report 614. In the third directory structure, a T1 Prj 652 and the T2 Prj 634 are provided at a level lower than a project 650. The same elements are denoted by the same reference numerals. For example, the strategy report 614 provided at a level lower than the kick off 612 in the first directory structure, which is located on the left of FIG. 6, is the same as the strategy report 614 provided at a level lower than the document 630 in the second directory structure, which is located in the middle of FIG. 6.

Associated metadata is metadata having a parent relationship or a child relationship with target metadata in a directory structure. In these examples, a parent in a directory structure represents only metadata right above target metadata, and a child in a directory structure represents only metadata right below target metadata. However, this is merely an example. Associated metadata may include a brother (metadata having the same parent), a parent's parent, a child's child, and the like. For example, metadata associated with the event 610 includes the kick off 612, the weekly report meeting 618, and the regular meeting 620. For example, metadata associated with the kick off 612 includes the event 610, the strategy report 614, and the report 616.

Figure 5:
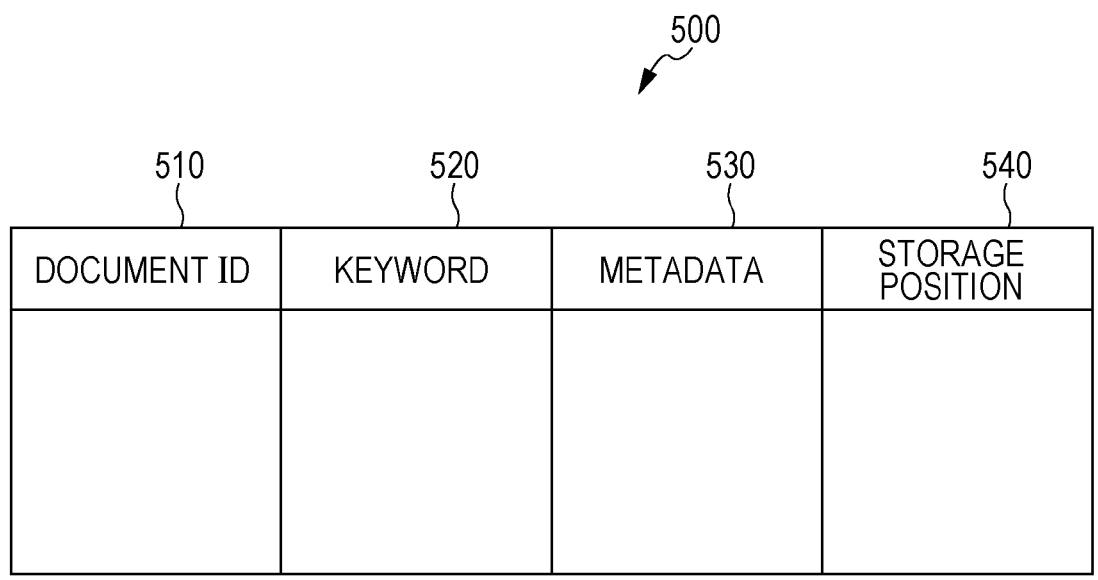
FIG. 5 is an explanatory diagram illustrating an example of the data structure of a document management data table.

The metadata DB 108 stores a document management table 500 in such a manner that metadata is searched for using a keyword. FIG. 5 is an explanatory diagram illustrating an example of the data structure of the document management table 500. The document management table 500 contains a document ID field 510, a keyword field 520, a metadata field 530, and a storage position field 540.

In this exemplary embodiment, a document ID serving as information uniquely identifying a document is stored in the document ID field 510.

A keyword assigned to the document is stored in the keyword field 520. This keyword is used for search. Plural keywords may be stored in the keyword field 520.

Metadata of the document is stored in the metadata field 530. The metadata is to be presented. For example, the metadata may include the document name, attribute, and the like of the document.

The position in the document DB 100 at which the document is stored is stored in the storage position field 540. For example, a document, URL, and the like are stored in the storage position field 540.

Although the example in which information on metadata etc. relevant to a document is stored has been explained above, information irrelevant to a document may be stored.

The metadata processing module 110 includes the metadata extracting module 112, the metadata structure processing module 114, the graph generating module 116, and the metadata significance calculating module 118.

The metadata extracting module 112 is connected to the metadata DB 108 and the metadata structure processing module 114. In the case where metadata presented by the metadata presenting module 126 is selected, the metadata extracting module 112 extracts metadata associated with the selected metadata from the metadata DB 108. For example, selection of information is made in accordance with a selecting operation performed by an operator and detected by a search UI module 124. Metadata associated with target metadata may be extracted by following the target metadata in the directory structure described above and searching for metadata having a parent or child relationship with the target metadata.

The metadata structure processing module 114 is connected to the metadata DB 108, the metadata extracting module 112, and the graph generating module 116. The metadata structure processing module 114 extracts characteristics relating to metadata or the association between plural pieces of metadata.

For example, the metadata structure processing module 114 may extract, as characteristics relating to metadata, the time at which the metadata was selected or the time at which metadata associated with the metadata was selected. Here, "the time at which metadata (A) associated with the metadata (B) was selected" represents the time at which information (B) was presented in accordance with selection of information (A).

Furthermore, for example, the metadata structure processing module 114 may extract, as characteristics relating to metadata, in the case where the metadata is selected, the number of pieces of metadata associated with the metadata or the number of times metadata associated with the metadata has been selected. Here, "in the case where the metadata (A) is selected, the number of pieces of metadata (B) associated with the metadata" represents the number of pieces of metadata (B) presented in accordance with selection of the metadata (A).

Furthermore, for example, the metadata structure processing module 114 may extract, as characteristics relating to the association between plural pieces of metadata, a value based on the number of times one of selected metadata and target metadata that are associated with each other in a path has been selected.

The graph generating module 116 is connected to the metadata DB 108 and the metadata structure processing module 114. The graph generating module 116 generates a graph of the association between plural pieces of metadata extracted by the metadata extracting module 112. For example, the graph generating module 116 generates a directed acyclic graph (DAG) or the like. A graph includes nodes and an edge (also called an arc or the like) indicating the association between the nodes. Metadata corresponds to a node. In the case where presented metadata (A) is selected and metadata (B) associated with the metadata (A) is extracted, an edge is generated between the two pieces of metadata (nodes). An edge has a direction. In the example described above, an edge directed from the metadata (A) to the metadata (B) is generated. The graph generated here might not be the same as the graph that is presented on a search UI displaying screen 134 by the metadata presenting module 126. That is, although the graph that is presented on the search UI displaying screen 134 by the metadata presenting module 126 has a limited number of pieces of metadata to be presented, the graph generated by the graph generating module 116 does not have a limited number of pieces of metadata since the graph is generated in accordance with metadata extracted by the metadata extracting module 112 (metadata associated with the selected metadata) and the association between plural pieces of metadata.

The metadata significance calculating module 118 is connected to the metadata DB 108. In the case where the metadata presenting module 126 presents metadata extracted by the metadata extracting module 112 and the number of pieces of metadata to be presented is greater than or equal to or greater than a predetermined number, the metadata significance calculating module 118 limits metadata to be presented on the basis of the characteristics extracted by the metadata structure processing module 114. That is, the number of pieces of metadata presented on the search UI displaying screen 134 is equal to or smaller than the predetermined number.

In addition, for example, the metadata significance calculating module 118 may limit metadata to be presented by selecting metadata to be presented by the metadata presenting module 126 or selecting, in a case where metadata has already been presented by the metadata presenting module 126, information for which presentation by the metadata presenting module 126 is to be deleted, in accordance with comparison between a value based on the characteristics extracted by the metadata structure processing module 114 and a predetermined threshold. That is, in the case where the number of pieces of metadata to be newly presented is greater than or equal to or greater than the predetermined number, the already presented metadata is deleted from the search UI displaying screen 134.

The metadata searching module 120 is connected to the metadata DB 108, the search UI module 124, and the metadata-corresponding document searching module 128. The metadata searching module 120 searches the metadata DB 108 for metadata using a keyword or the like received by the search UI module 124 in accordance with a search operation or the like performed by an operator.

The metadata displaying module 122 includes the search UI module 124, the metadata presenting module 126, and the search UI displaying screen 134.

The search UI module 124 is connected to the metadata searching module 120, the metadata presenting module 126, and the search UI displaying screen 134. The search UI module 124 receives a search operation or the like performed by an operator and transfers a keyword or the like for search to the metadata searching module 120. The search UI module 124 also detects a selecting operation by an operator for metadata presented on the search UI displaying screen 134. When detecting a selecting operation, the search UI module 124 transfers the selected metadata to the metadata extracting module 112.

The metadata presenting module 126 is connected to the metadata DB 108 and the search UI module 124. The metadata presenting module 126 presents metadata to the search UI displaying screen 134. The metadata presenting module 126 may also present the association between plural pieces of metadata using an arrow or the like. The metadata presenting module 126 presents metadata for which presentation is limited by the metadata significance calculating module 118.

The metadata presenting module 126 may also present information (an icon, mark, graphic form, or the like) indicating that metadata for which presentation is deleted was previously presented.

The metadata-corresponding document searching module 128 is connected to the metadata searching module 120 and the metadata-corresponding document outputting module 130. The metadata-corresponding document searching module 128 searches the document DB 100 for a document associated with metadata. For example, in the case where metadata is the name, attribute, or the like of a document, the metadata-corresponding document searching module 128 searches the document DB 100 for the document. In the case where metadata is information irrelevant to a document, the metadata-corresponding document searching module 128 may present that the metadata is irrelevant to a document or may prepare in advance a table in which the metadata is associated with a document and search for the document corresponding to the metadata on the basis of the table.

The metadata-corresponding document outputting module 130 is connected to the document DB 100, the metadata-corresponding document searching module 128, and a document outputting screen 136. The metadata-corresponding document outputting module 130 extracts a document found by the metadata-corresponding document searching module 128 from the document DB 100 and outputs the extracted document as the document outputting screen 136.

The searching/outputting module 132 includes the search UI displaying screen 134 and the document outputting screen 136.

The search UI displaying screen 134 is connected to the search UI module 124 and the document outputting screen 136. The search UI displaying screen 134 is a screen for receiving a keyword for search and for presenting metadata (including an arrow or the like indicating the association between plural pieces of metadata) or the like serving as a search result. An example of the search UI displaying screen 134 will be described later with reference to FIG. 10 and the like.

The document outputting screen 136 is connected to the metadata-corresponding document outputting module 130 and the search UI displaying screen 134. The document outputting screen 136 is a screen for presenting a document output by the metadata-corresponding document outputting module 130.

The search UI displaying screen 134 and the document outputting screen 136 are presented on, for example, a presentation device (a liquid crystal display, a touch panel, or the like) provided in an exemplary embodiment.

Figure 2:
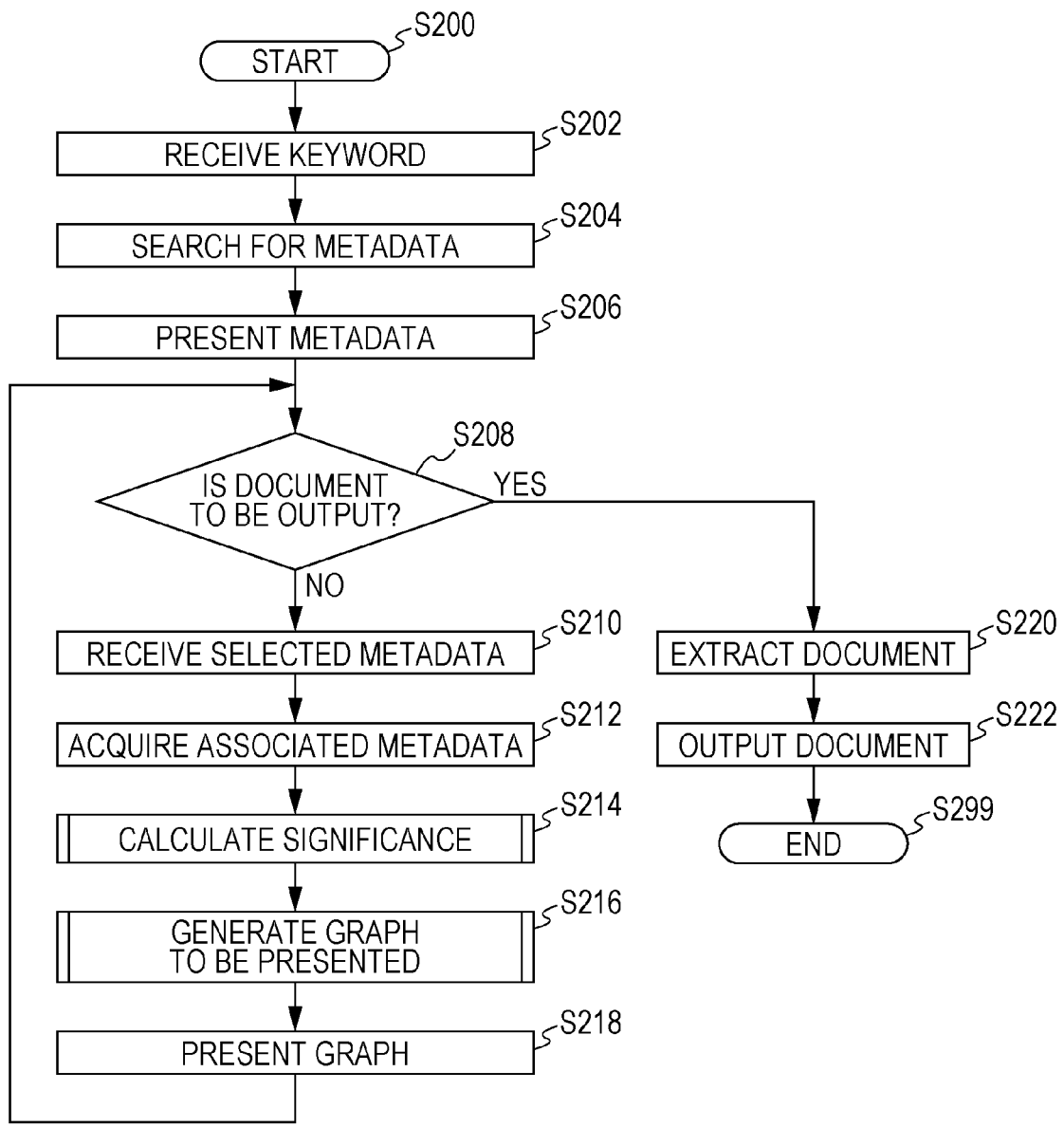
FIG. 2 is a flowchart illustrating an example of a process according to an exemplary embodiment.

FIG. 2 is a flowchart illustrating an example of a process according to an exemplary embodiment.

Figure 10:
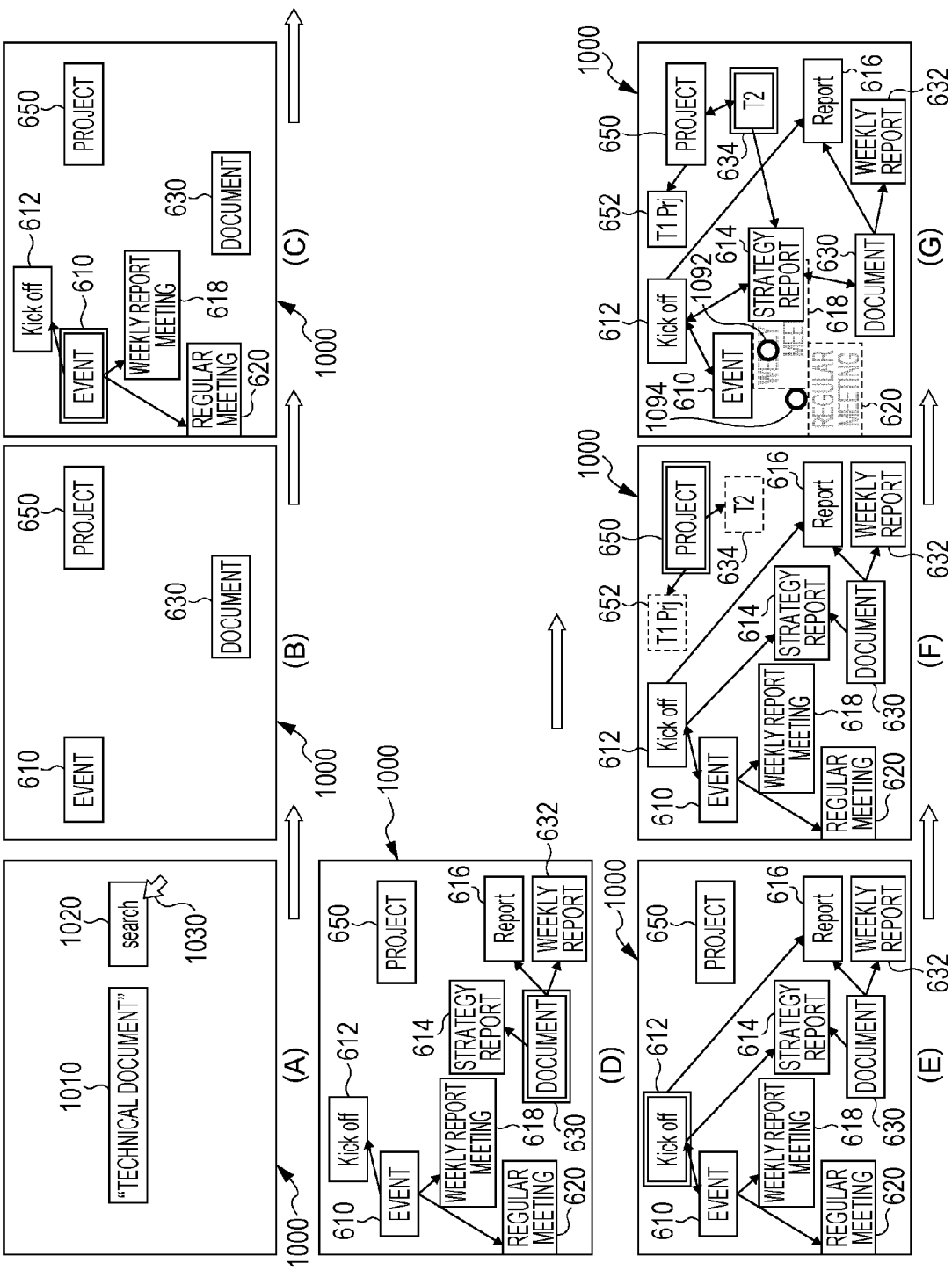
FIG. 10 is an explanatory diagram illustrating an example of the transition of presentation of metadata.

In step S202, the search UI module 124 receives a keyword. FIG. 10 is an explanatory diagram illustrating an example of the transition of presentation of metadata. On a display screen 1000 illustrated in an example of part (A) of FIG. 10, a keyword receiving region 1010, a search instructing button 1020, and a mouse cursor 1030 are presented. In the keyword receiving region 1010, a keyword used for search is described. When the search instructing button 1020 is selected by the mouse cursor 1030 in accordance with an operation performed by an operator, the search UI module 124 receives a character string inside the keyword receiving region 1010 as a keyword.

In step S204, the metadata searching module 120 searches the metadata DB 108 for metadata. For example, the metadata searching module 120 may search the keyword field 520 of the document management table 500 for the keyword received in step S202 and extract metadata corresponding to the keyword.

In step S206, the metadata presenting module 126 presents the found metadata. On the display screen 1000 illustrated in an example of part (B) of FIG. 10, the event 610, the document 630, and the project 650, which are metadata found in step S204, are presented. Arrangement of these metadata may be determined, for example, by equally dividing the display screen 1000 into the number of pieces of metadata to be presented.

In step S208, the search UI module 124 determines whether or not to output a document. If it is determined that a document is to be output, the process proceeds to step S220. If it is determined that a document is not to be output, the process proceeds to step S210. For example, in the case where a document outputting operation has been performed by the operator for a document corresponding to the target metadata, the process proceeds to step S220.

In step S210, the search UI module 124 receives the selected metadata. For example, in the case where a selecting operation performed by the operator for metadata presented on the search UI displaying screen 134 is detected, the metadata corresponds to the selected metadata.

In step S212, the metadata extracting module 112 and the metadata structure processing module 114 acquire associated metadata. The metadata extracting module 112 and the metadata structure processing module 114 acquire metadata associated with the metadata selected in step S210.

In step S214, the metadata significance calculating module 118 calculates the significance. The calculation of significance will be described later with reference to FIG. 3.

In step S216, the metadata presenting module 126 generates a graph to be presented. Generation of a graph to be presented will be described later with reference to FIG. 4.

In step S218, the metadata presenting module 126 presents the generated graph. On the display screen 1000 illustrated in the example of part (C) of FIG. 10, the event 610 is selected from the state illustrated in an example of part (B) of FIG. 10, and the kick off 612, the weekly report meeting 618, and the regular meeting 620 are presented as metadata associated with the event 610. In addition, arrows are presented between the event 610 and the kick off 612, between the event 610 and the weekly report meeting 618, and between the event 610 and the regular meeting 620.

In step S220, the metadata-corresponding document searching module 128 extracts the document from the document DB 100.

In step S222, the metadata-corresponding document outputting module 130 outputs the document to the document outputting screen 136.

Figure 3:
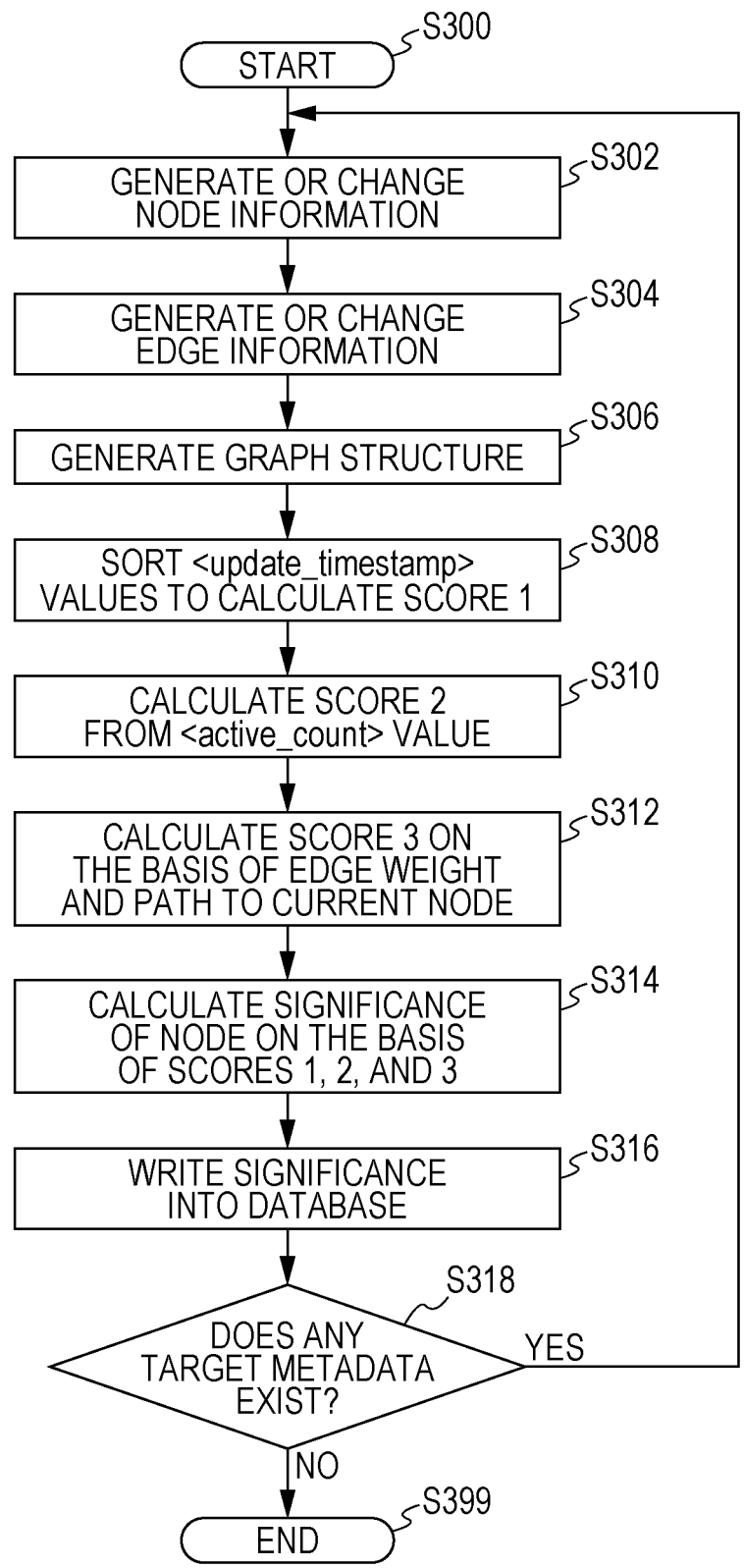
FIG. 3 is a flowchart illustrating an example of a process according to an exemplary embodiment.

FIG. 3 is a flowchart illustrating an example of a process (step S214) according to an exemplary embodiment.

In step S302, the metadata extracting module 112 generates or changes node information. The metadata extracting module 112 generates node information corresponding to the found or selected metadata. In the case where node information has already been generated, the metadata extracting module 112 changes the node information corresponding to the metadata. For metadata associated with the selected metadata, the metadata extracting module 112 generates node information corresponding to the associated metadata. In the case where the node information has already been generated, the metadata extracting module 112 changes the node information corresponding to the associated metadata. A node and metadata are associated with each other in a one-to-one relationship. However, in the case where found metadata or presented metadata is selected and metadata associated with the selected metadata is extracted, the extracted metadata is called a node. That is, metadata in the case where a graph structure is generated by a selecting operation is called a node.

For example, node information includes <node_id><timestamp><update_timestamp><active_count><out_edge><in_edge>.

In the node information, <node_id> may uniquely identify the node in this exemplary embodiment. In the node information, <timestamp> indicates the time (here, the time is the combination of year, month, date, hour, minute, second, and a unit of time smaller than a second, and the same applies to the following) at which the node was found or selected. In the node information, <update_timestamp> indicates the latest time at which the node was found or selected. In the node information, <active_count> indicates, in the case where the node is selected, the number of nodes associated with the selected node (that is, the number of nodes that may be displayed by the selection) or the total number of times the node associated with the selected node has been selected. In the node information, <out_edge> indicates an edge ID that uniquely identifies an edge connected to the node and directed from the node to another node. That is, when the node is selected and an associated node is extracted, <out_edge> is generated. In the node information, <in_edge> indicates an edge ID that uniquely identifies an edge connected to the node and directed to the node from another node. That is, when a node associated with the node is selected and the target node is extracted, <in_edge> is generated.

As in a node data table 1200 described later with reference to FIG. 12, node information may include <disctence>.

In step S304, the metadata structure processing module 114 generates or changes edge information. In the case where the association between nodes is newly generated (in the case where a new node is generated or a new edge is generated between existing nodes), the metadata structure processing module 114 generates edge information. In the case where one of two nodes associated with an edge is selected, edge information is changed.

For example, edge information includes <edge_id><active_timestamp><update_active_timestamp><active_count><from><to>.

In the edge information, <edge_id> uniquely identifies the edge in this exemplary embodiment. In the edge information, <active_timestamp> indicates the time at which a node associated with the edge was found or selected. In the edge information, <update_active_timestamp> indicates the latest time at which a node associated with the edge was found or selected. In the edge information, <active_count> indicates the number of times a node associated with the edge has been found or selected. Since an edge is generated when a node is selected, the initial value of <active_count> is "1". In the case where one of two nodes associated with the edge is selected, <active_count> is incremented. In the edge information, <from> is an edge ID that uniquely identifies the source node for the edge. That is, <from> identifies a node found or selected in the case where the edge is generated. In the edge information, <to> indicates an edge ID that uniquely identifies a node to which the edge is directed. That is, <to> indicates a node (extracted node) associated with the found or selected node in the case where the edge is generated.

In step S306, the graph generating module 116 generates a graph structure. For example, the graph generating module 116 generates a graph structure by which a DAG may be generated on the basis of the node information and the edge information.

In step S308, the metadata significance calculating module 118 sorts the <update_timestamp> values in the node information in an ascending order to calculate score 1. That is, the order is defined as score 1.

In step S310, the metadata significance calculating module 118 calculates score 2 on the basis of the <active_count> value in the node information.

In step S312, the metadata significance calculating module 118 calculates score 3 on the basis of the edge weight and the path to the current node. That is, score 3 is calculated on the basis of the number of times one of the selected node and the target node that are associated with each other in a path has been selected. More specifically, an edge of the path between the currently selected node and the node for which the significance is to be calculated is extracted and the reciprocal of <active_count> of the edge is obtained. In the case where plural edges exist as paths, the sum of the reciprocals of <active_count> of individual edges is calculated as score 3.

In step S314, the metadata significance calculating module 118 calculates the significance of the node on the basis of scores 1, 2, and 3. Any one of scores 1, 2, and 3 may be directly used as a significance. Alternatively, the significance may be calculated on the basis of the combination of two or more of scores 1, 2, and 3.

For example, the significance may be calculated as follows:

Significance cid=w1*score 1+w2*score 2+w3*score 3, where "w1", "w2", and "w3" represent predetermined weight coefficients. In the case where a higher value in the significance represents a higher significance (presentation of a node having a higher significance is less likely to be deleted), "w3" represents a negative value. Alternatively, the significance may be calculated as follows:

Significance cid=w1*score 1+w2*score 2+w3/score 3.

In step S316, the metadata significance calculating module 118 writes the significance into the metadata DB 108.

In step S318, the metadata extracting module 112 determines whether or not any target metadata exists. If it is determined that any target metadata exists, the process returns to step S302. If it is determined that no target metadata exists, the process is terminated (step S399).

Figure 4:
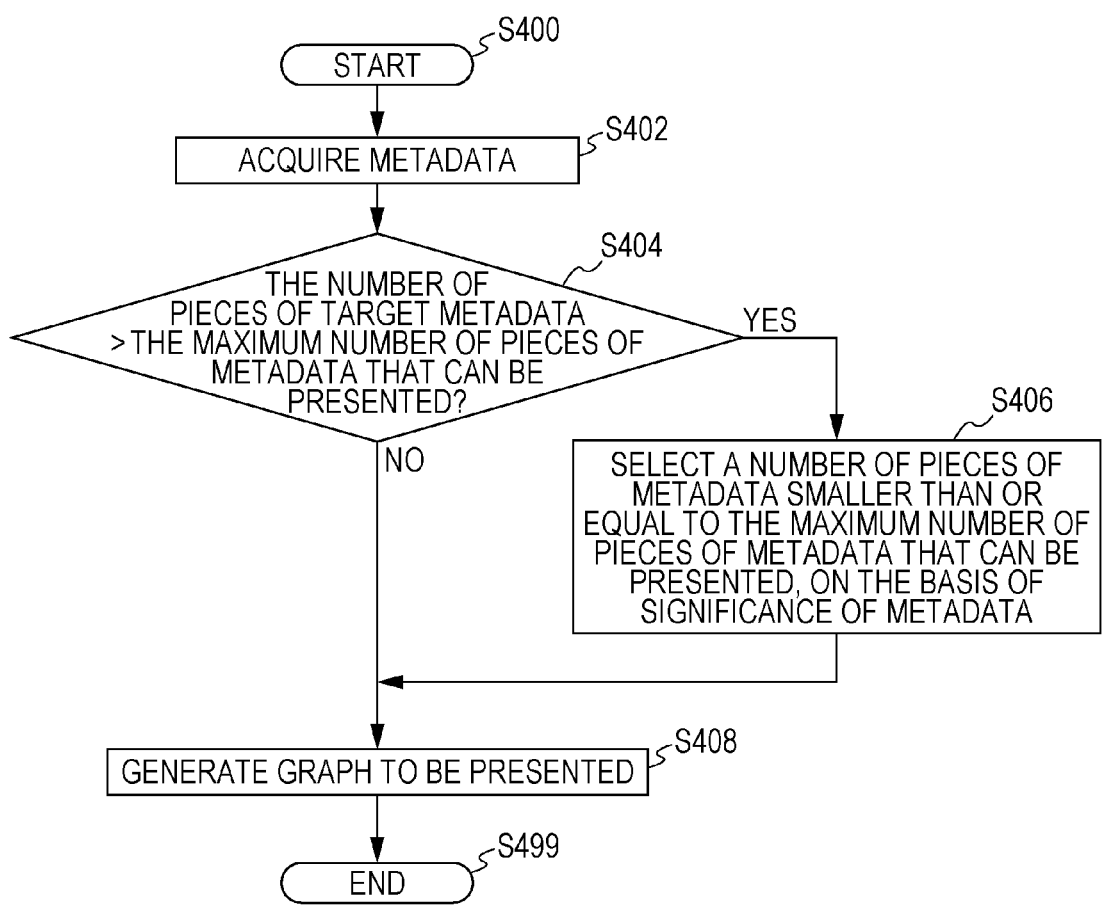
FIG. 4 is a flowchart illustrating an example of a process according to an exemplary embodiment.

FIG. 4 is a flowchart illustrating an example of a process (step S216) according to an exemplary embodiment.

In step S402, the metadata extracting module 112 and the metadata structure processing module 114 acquire target metadata. For example, metadata in a graph generated by the graph generating module 116 may be extracted. The number of pieces of metadata extracted is the maximum number of pieces of metadata that may be presented.

In step S404, the metadata presenting module 126 determines whether the number of pieces of target metadata is greater than the maximum number of pieces of metadata that can be presented. If it is determined that the number of pieces of target metadata is greater than the maximum number of pieces of metadata that can be presented, the process proceeds to step S406. If it is determined that the number of pieces of target metadata is smaller than or equal to the maximum number of pieces of metadata than can be presented, the process proceeds to step S408. The maximum number of pieces of metadata that can be presented is a predetermined number.

In step S406, the metadata presenting module 126 selects, on the basis of the significance of metadata, a number of pieces of metadata smaller than or equal to the maximum number of pieces of metadata that can be presented as metadata to be presented. For example, sorting may be performed in a descending order on the basis of the significance of metadata, and the maximum number of pieces of metadata that can be presented may be selected from the metadata having the highest significance. Obviously, nodes for which selection is to be deleted may be selected in a similar manner.

In step S408, the metadata presenting module 126 generates a graph to be presented. Information indicating that information for which presentation is deleted was previously presented may be presented.

FIG. 10 is an explanatory diagram illustrating an example of the transition of presentation of metadata.

The display screen 1000 illustrated in the example of part (A) of FIG. 10 has been explained above in step S202.

The display screen 1000 illustrated in the example of part (B) of FIG. 10 has been explained above in step S206. The display screen 1000 illustrated in the example of part (C) of FIG. 10 has been explained above in step S218. The maximum number of pieces of metadata that can be presented is set to 10.

In the display screen 1000 illustrated in an example of part (D) of FIG. 10, the document 630 is selected from the state illustrated in the example of part (C) of FIG. 10, and the strategy report 614, the report 616, and the weekly report 632 are presented as metadata associated with the document 630. Furthermore, arrows are presented between the document 630 and the strategy report 614, between the document 630 and the report 616, and between the document 630 and the weekly report 632.

In the display screen 1000 illustrated in an example of part (E) of FIG. 10, the kick off 612 is selected from the state illustrated in the example of part (D) of FIG. 10. No metadata is newly presented as metadata associated with the kick off 612. Arrows are presented between the kick off 612 and the strategy report 614, which has already been presented, and between the kick off 612 and the report 616, which has already been presented. An arrow in the opposite direction is also presented between the kick off 612 and the event 610.

In the display screen 1000 illustrated in an example of part (F) of FIG. 10, the project 650 is selected from the state illustrated in the example of part (E) of FIG. 10. The T1 Prj 652 and the T2 Prj 634 are intended to be presented as metadata associated with the project 650. However, the number of pieces of metadata to be presented is 11, which exceeds the maximum number "10" of pieces of metadata that can be presented. Thus, metadata is deleted from the plural pieces of metadata to be presented on the basis of the significance cid, so that the number of pieces of metadata to be presented does not exceed the maximum number of pieces of metadata that can be presented. More specifically, metadata is deleted as described below with reference to FIGS. 22 to 24.

In the display screen 1000 illustrated in an example of part (G) of FIG. 10, the T2 Prj 634 is selected from the state illustrated in the example of part (F) of FIG. 10. No metadata is newly presented as metadata associated with the T2 Prj 634. An arrow is presented between the T2 Prj 634 and the strategy report 614, which has already been presented. An arrow in the opposite direction is also presented between the T2 Prj 634 and the project 650. However, the number of pieces of metadata to be presented (the number of nodes in a graph generated by the graph generating module 116) is 11, which exceeds the maximum number "10" of pieces of metadata that can be presented. Thus, presentation of the weekly report meeting 618 and the regular meeting 620 are deleted. Obviously, presentation of arrows between the event 610 and the weekly report meeting 618 and between the event 610 and the regular meeting 620 are also deleted. Then, the T1 Prj 652 and the T2 Prj 634 are presented. Furthermore, arrows are presented between the project 650 and the T1 Prj 652 and between the project 650 and the T2 Prj 634.

Figures 11, 12:
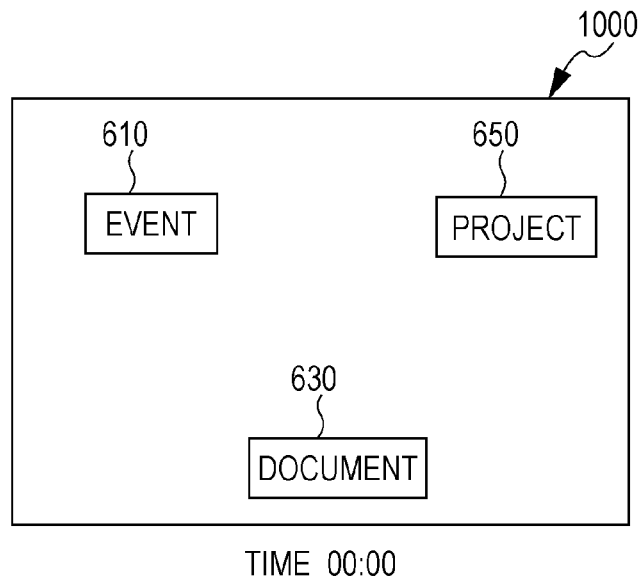
FIG. 11 is an explanatory diagram illustrating an example of a display screen.
FIG. 12 is an explanatory diagram illustrating an example of the data structure of a node data table.

FIG. 11 is an explanatory diagram illustrating the example of the display screen 1000 in the state illustrated in part (B) of FIG. 10. The node data table 1200 in this state will be explained with reference to FIG. 12. The node data table 1200 contains a node field 1210, an id field 1220, a timestamp field 1230, an update_timestamp field 1240, an active_count field 1250, an out_edge field 1260, an in_edge field 1270, and a distance field 1280. The node field 1210 stores the name of node information (metadata to be presented). The id field 1220 stores <node_id> of the node information. The timestamp field 1230 stores <timestamp> of the node information. The update_timestamp field 1240 stores <update_timestamp> of the node information. The active_count field 1250 stores <active_count> of the node information. The out_edge field 1260 stores <out_edge> of the node information. The in_edge field 1270 stores <in_edge> of the node information. The disctence field 1280 stores the value corresponding to score 3. Here, only found metadata is presented, and edge information does not exist. Thus, "−1" is stored as an initial value. In the case where a path exists between the selected node and this node (a node in each row in the node data table 1200), the value other than "−1" is stored.

The node data table 1200 is generated and changed by the metadata structure processing module 114 and the metadata significance calculating module 118.

Figures 13, 14:
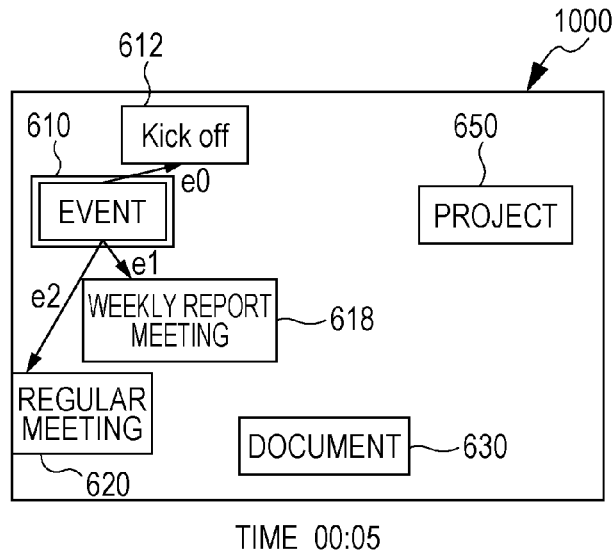
FIG. 13 is an explanatory diagram illustrating an example of a display screen.
FIG. 14 is an explanatory diagram illustrating an example of the data structure of a node data table.

FIG. 13 is an explanatory diagram illustrating an example of the display screen 1000 in the state illustrated in part (C) of FIG. 10. The node data table 1200 in this state will be explained with reference to FIG. 14. In addition, an edge data table 1500 in this state will be explained with reference to FIG. 15.

The node data table 1200 illustrated in the example of FIG. 14 differs from the node data table 1200 illustrated in the example of FIG. 12 in that rows of a "kick off" (id=3), a "weekly report meeting" (id=4), and a "regular meeting"

(id=5) are added to the node field 1210, the timestamp field 1230 and the update_timestamp field 1240 store "00:05", the active_count field 1250 stores "1", the out_edge field 1260 stores "null", the in_edge field 1270 stores "e0", "e1", and "e2", and the disctence field 1280 stores "1".

The value "1" in the active_count field 1250 represents the number of times a node (the event 610) associated with the node was selected at that time.

The value "1" in the disctence field 1280 represents the result obtained by adding the reciprocals of individual edges of paths in an active_count field 1540 in the edge data table 1500. More specifically, for example, only the edge e0 exists as the path from the kick off 612 to the event 610, the active_count field 1540 for the edge e0 is "1", and the reciprocal of "1" is "1".

In the row of the "event" (id=0) in the node field 1210, the value of the update_timestamp field 1240 is changed to "00:05", the value of the active_count field 1250 is changed to "3", the value of the out_edge field 1260 is changed to "e0", "e1", and "e2", and the value of the disctence field 1280 is changed to "0".

The changed value "3" in the active_count field 1250 represents, in the case where the node is selected, the number of nodes (the kick off 612, the weekly report meeting 618, and the regular meeting 620) associated with the node.

The value "0" in the disctence field 1280 represents that the node is selected.

Figures 15, 16:
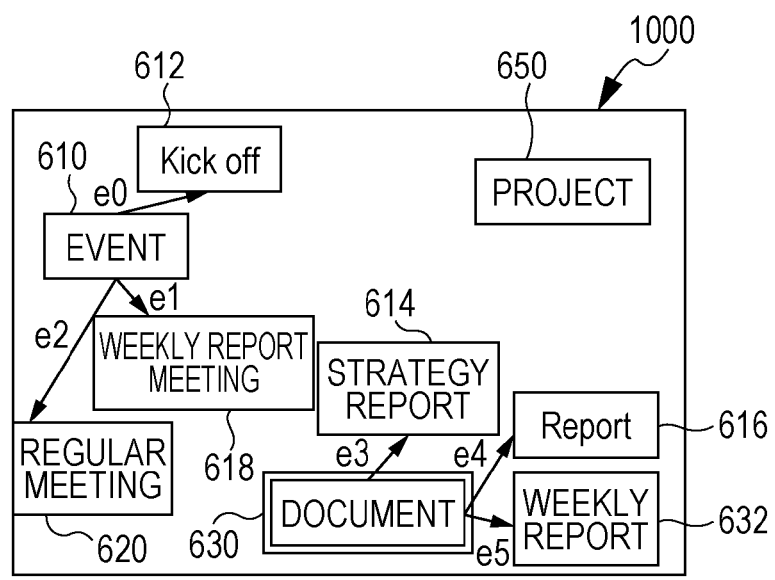
FIG. 15 is an explanatory diagram illustrating an example of the data structure of an edge data table.
FIG. 16 is an explanatory diagram illustrating an example of a display screen.

FIG. 15 is an explanatory diagram illustrating an example of the data structure of the edge data table 1500. The edge data table 1500 contains an edge id field 1510, an active-timestamp field 1520, an update_active_timestamp field 1530, and an active_count field 1540. The edge id field 1510 stores <node_id> of the edge information. The active-timestamp field 1520 stores <active_timestamp> of the edge information. The update_active_timestamp field 1530 stores <update_active_timestamp> of the edge information. The active_count field 1540 stores <active_count> of the edge information.

Here, since an edge is generated in the case where the node of the event 610 is selected, the active_count field 1540 stores "1".

FIG. 16 is an explanatory diagram illustrating an example of the display screen 1000 in the state illustrated in part (D) of FIG. 10. The node data table 1200 in this state will be explained with reference to FIG. 17. In addition, the edge data table 1500 in this state will be explained with reference to FIG. 18.

The node data table 1200 illustrated in the example of FIG. 17 differs from the node data table 1200 illustrated in the example of FIG. 14 in that rows of a "strategy report" (id=6), a "report" (id=7), and a "weekly report" (id=8) are added to the node field 1210, the timestamp field 1230 and the update_timestamp field 1240 store "00:10", the active_count field 1250 stores "1", the out_edge field 1260 stores "null", the in_edge field 1270 stores "e3", "e4", and "e5", and the disctence field 1280 stores "1". The value "1" in the disctence field 1280 represents the result obtained by adding the reciprocals of individual edges of paths in the active_count field 1540 of the edge data table 1500. More specifically, for example, only the edge e3 exists as the path from the strategy report 614 to the document 630, the value of the active_count field 1540 for the edge e3 is "1", and the reciprocal of "1" is "1".

In the row of the "event" (id=0) in the node field 1210, the value of the disctence field 1280 is changed to "–1". In the row of a "document" (id=2) in the node field 1210, the value of the update_timestamp field 1240 is changed to "00:10", the value of the active_count field 1250 is changed to "3", the value of the out_edge field 1260 is changed to "e3", "e4", and "e5", and the value of the disctence field 1280 is changed to "0". The changed value "3" in the active_count field 1250 represents, in the case where the node is selected, the number of nodes (the strategy report 614, the report 616, and the weekly report 632) associated with the node. The changed value "0" in the disctence field 1280 represents that the currently selected node is the document 630.

In the rows of the "kick off" (id=3), the "weekly report meeting" (id=4), and the "regular meeting" (id=5), the value of the disctence field 1280 is changed to "–1". The changed value "–1" in the disctence field 1280 represents that no path exists between the currently selected document 630 and the node.

The edge data table 1500 illustrated in the example of FIG. 18 differs from the edge data table 1500 illustrated in the example of FIG. 15 in that rows of "e3", "e4", and "e5" are added to the edge id field 1510, the active-timestamp field 1520 and the update_active_timestamp field 1530 store "00:10", and the active_count field 1540 stores "1".

Figures 19, 20:
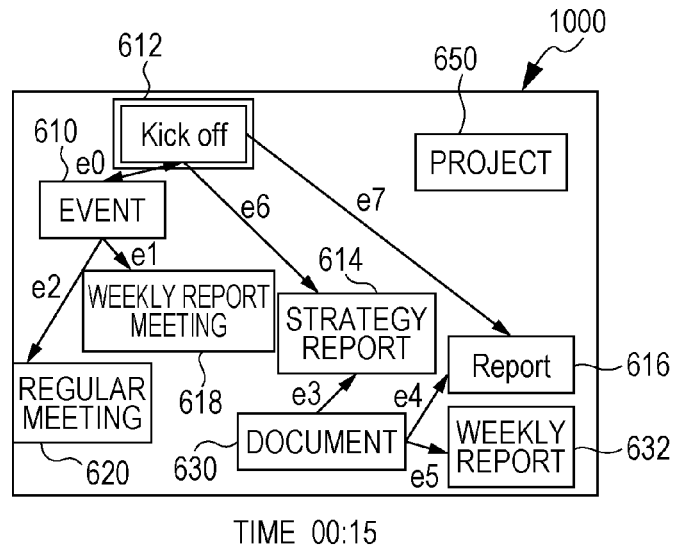
FIG. 19 is an explanatory diagram illustrating an example of a display screen.
FIG. 20 is an explanatory diagram illustrating an example of the data structure of a node data table.

FIG. 19 is an explanatory diagram illustrating an example of the display screen 1000 in the state illustrated in part (E) of FIG. 10. The node data table 1200 in this state will be explained with reference to FIG. 20. In addition, the edge data table 1500 in this state will be explained with reference to FIG. 21.

The node data table 1200 illustrated in the example of FIG. 20 differs from the node data table 1200 illustrated in the example of FIG. 17 in that, in the row of the "event" (id=0) in the node field 1210, the value of the update_timestamp field 1240 is changed to "00:15", the value of the active_count field 1250 is changed to "4", and the value of the disctence field 1280 is changed to "0.5". The changed value "4" in the active_count field 1250 represents that since the kick off 612 associated with the event 610 is selected, "1" is added to the value "3" of the active_count field 1250 in the node data table 1200 illustrated in the example of FIG. 17, which is in the previous state. The changed value "0.5" in the disctence field 1280 represents that the reciprocal of "2", which is the value of the path "e0" from the currently selected kick off 612 to the event 610 in the active_count field 1540, is "½".

Furthermore, in the row of the "document" (id=2), the value of the disctence field 1280 is changed to "2". The changed value "2" in the disctence field 1280 represents that since the values of the paths (e6 and e3 or e7 and e4) from the currently selected kick off 612 to the document 630 in the active_count field 1540 are each "1" and the reciprocal of "1" is "1", the sum of "1" and "1" is "2".

Furthermore, in the row of the "kick off" (id=3), the value of the update_timestamp field 1240 is changed to "00:15", the value of the active_count field 1250 is changed to "4", the value of the out_edge field 1260 is changed to "e6 e7", and the value of the disctence field 1280 is changed to "0".

Furthermore, in the rows of the "weekly report meeting" (id=4) and the "regular meeting" (id=5), the value of the disctence field 1280 is changed to "1.5". The changed value "1.5" represents that, for example, since the values of the paths (e0 and e1) from the currently selected kick off 612 to the weekly report meeting 618 in the active_count field 1540 are "2" and "1" and the reciprocals of "2" and "1" are "½" and "1", the sum of "½" and "1" is "1.5".

Furthermore, in the row of the "strategy report" (id=6), the value of the update_timestamp field 1240 is changed to "00:15", the value of the active_count field 1250 is changed to "2", and the value of the in_edge field 1270 is changed to "e3 e6".

Furthermore, in the row of the "report" (id=7), the value of the update_timestamp field 1240 is changed to "00:15", the value of the active_count field 1250 is changed to "2", and the value of the in_edge field 1270 is changed to "e4 e7".

Furthermore, in the row of the "weekly report" (id=8), the value of the disctence field 1280 is changed to "3". The changed value "3" in the disctence field 1280 represents that since the values of the paths (e6, e3, and e5 or e7, e4, and e5) from the currently selected kick off 612 to the weekly report 632 in the active_count field 1540 are each "1" and the reciprocal of "1" is "1", the sum of "1", "1", and "1" is "3".

Figures 21, 22:
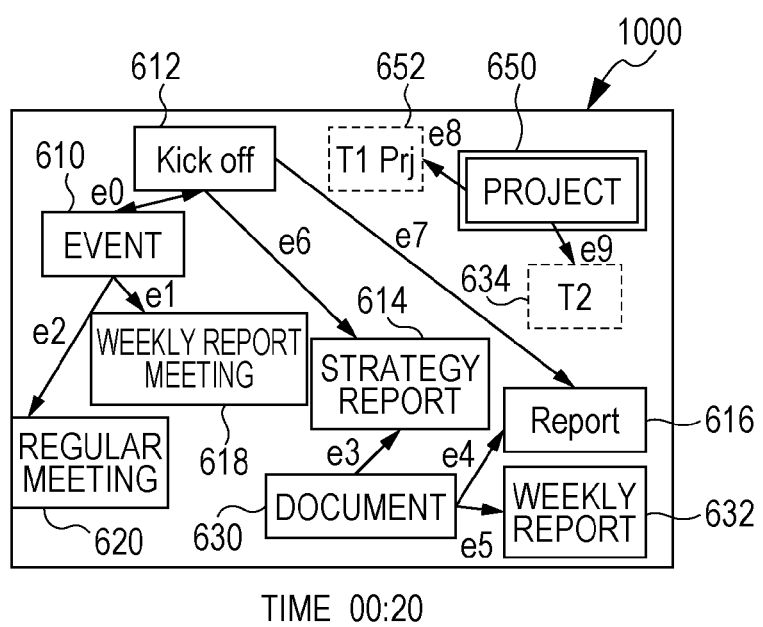
FIG. 21 is an explanatory diagram illustrating an example of the data structure of an edge data table.
FIG. 22 is an explanatory diagram illustrating an example of a display screen.

The edge data table 1500 illustrated in the example of FIG. 21 differs from the edge data table 1500 illustrated in the example of FIG. 18 in that rows of "e6" and "e7" are added to the edge id field 1510, the active-timestamp field 1520 and the update_active_timestamp field 1530 store "00:15", and the active_count field 1540 stores "1".

In the row of "e0" in the edge id field 1510, the value of the update_active_timestamp field 1530 is changed to "00:15", and the value of the active_count field 1540 is changed to "2". The changed value "2" in the active_count field 1540 represents that since the kick off 612 of the node associated with the edge e0 is selected, "1" is added to "1" in the active_count field 1540 of the edge data table 1500 illustrated in the example of FIG. 18, which is in the previous state.

FIG. 22 is an explanatory diagram illustrating an example of the display screen 1000 in the state of part (F) of FIG. 10. The node data table 1200 in this state will be explained with reference to FIG. 23. In addition, the edge data table 1500 in this state will be explained with reference to FIG. 24.

Figure 23:
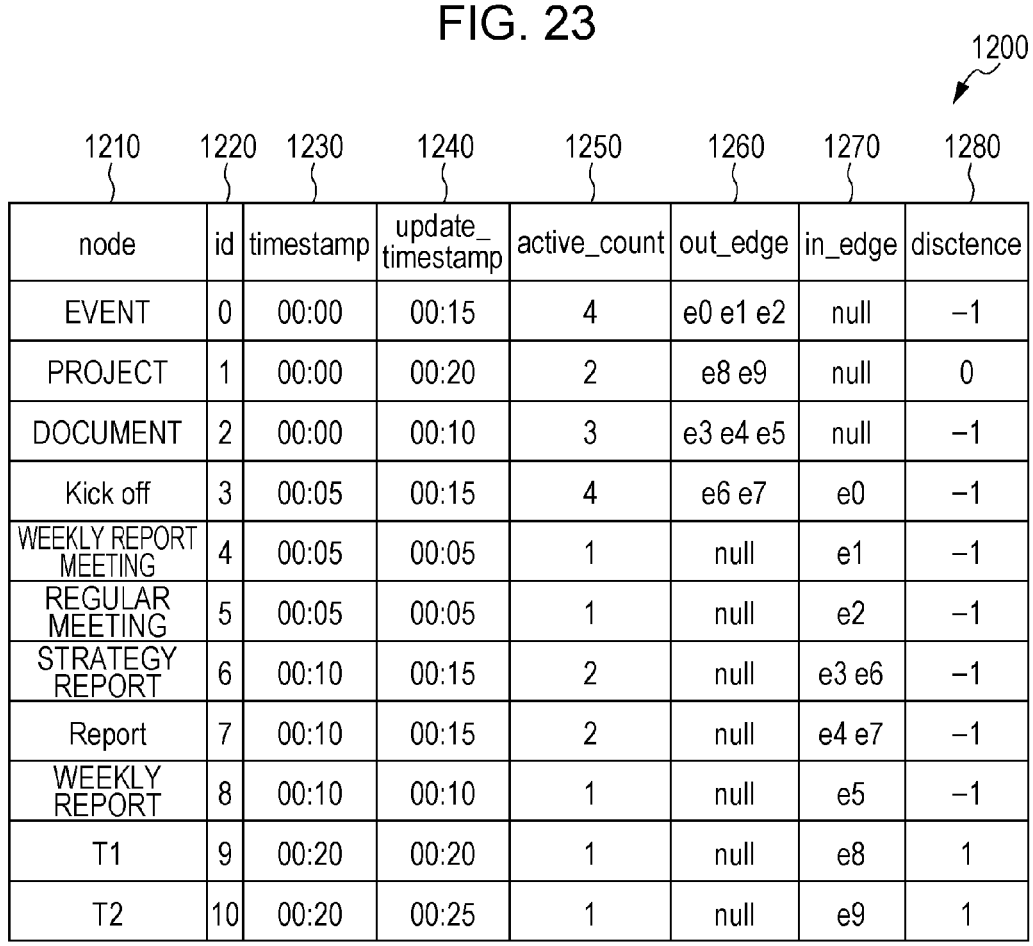
FIG. 23 is an explanatory diagram illustrating an example of the data structure of a node data table.

The node data table 1200 illustrated in the example of FIG. 23 differs from the node data table 1200 illustrated in the example of FIG. 20 in that rows of a "T1" (id=9) and a "T2" (id=10) are added to the node field 1210, the timestamp field 1230 stores "00:20", the update_timestamp field 1240 stores "00:20" for the "T1" and "00:25" for the "T2", the active_count field 1250 stores "1", the out_edge field 1260 stores "null", the in_edge field 1270 stores "e8" for the "T1" and "e9" for the "T2", and the disctence field 1280 stores "1".

In the row of the "event" (id=0) in the node field 1210, the value of the disctence field 1280 is changed to "−1". In the row of the "project" (id=1), the value of the update_timestamp field 1240 is changed to "00:20", the value of the active_count field 1250 is changed to "2", the value of the out_edge field 1260 is changed to "e8 e9", and the value of the disctence field 1280 is changed to "0".

Furthermore, in the rows of the "document" (id=2), the "kick off" (id=3), the "weekly report meeting" (id=4), the "regular meeting" (id=5), the "strategy report" (id=6), the "report" (id=7), and the "weekly report" (id=8), the value of the disctence field 1280 is changed to "−1".

Figures 24, 25:
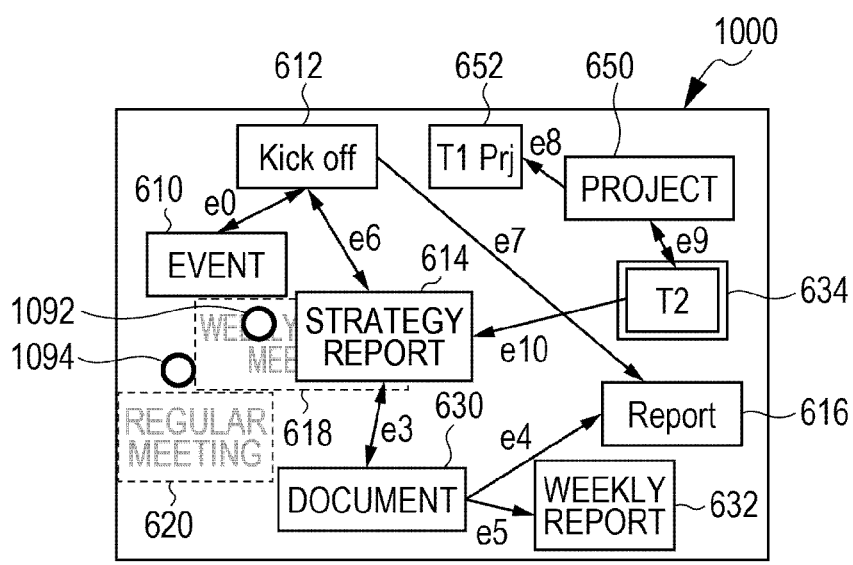
FIG. 24 is an explanatory diagram illustrating an example of the data structure of an edge data table.
FIG. 25 is an explanatory diagram illustrating an example of a display screen.

The edge data table 1500 illustrated in the example of FIG. 24 differs from the edge data table 1500 illustrated in the example of FIG. 21 in that rows of "e8" and "e9" are added to the edge id field 1510, the active-timestamp field 1520 and the update_active_timestamp field 1530 store "00:20", and the active_count field 1540 stores "1".

At this point in time, the number of pieces of metadata to be presented is "11", which exceeds the maximum number "10" of pieces of metadata that can be presented. Thus, metadata having a low significance cid is deleted by calculating the significance cid on the basis of the weight coefficients $w_1$, $w_2$, and $w_3$.

FIG. 25 is an explanatory diagram illustrating an example of the display screen 1000 in the state of part (G) of FIG. 10. The node data table 1200 in this state will be explained with reference to FIG. 26. In addition, the edge data table 1500 in this state will be explained with reference to FIG. 27.

Figure 26:
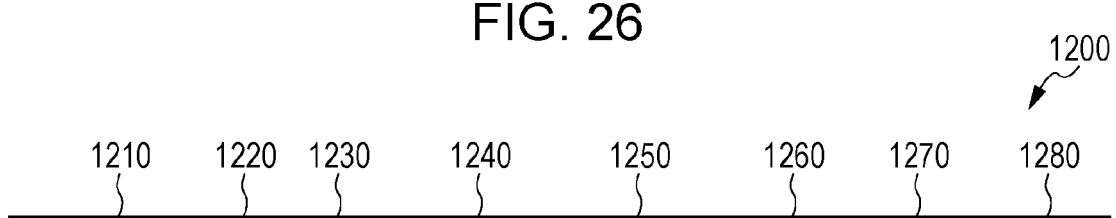
FIG. 26 is an explanatory diagram illustrating an example of the data structure of a node data table.

The node data table 1200 illustrated in the example of FIG. 26 differs from the node data table 1200 illustrated in the example of FIG. 23 in that, in the row of the "event" (id=0) in the node field 1210, the value of the disctence field 1280 is changed to "2.5".

Furthermore, in the row of the "project" (id=1), the value of the update_timestamp field 1240 is changed to "00:25", the value of the active_count field 1250 is changed to "3", and the value of the disctence field 1280 is changed to "0.5".

Furthermore, in the rows of the "document" (id=2) and the "kick off" (id=3), the value of the disctence field 1280 is changed to "2".

Furthermore, in the rows of the "weekly report meeting" (id=4) and the "regular meeting" (id=5), the value of the disctence field 1280 is changed to "3.5".

Furthermore, in the row of the "strategy report" (id=6), the value of the update_timestamp field 1240 is changed to "00:25", the value of the active_count field 1250 is changed to "3", and the value of the disctence field 1280 is changed to "1".

Furthermore, in the rows of the "report" (id=7) and the "weekly report" (id=8), the value of the disctence field 1280 is changed to "3".

Furthermore, in the row of the "T1" (id=9), the value of the disctence field 1280 is changed to "1.5". In the row of the "T2" (id=10), the value of the active_count field 1250 is changed to "3", the value of the out_edge field 1260 is changed to "e10", and the value of the disctence field 1280 is changed to "0".

The edge data table 1500 illustrated in the example of FIG. 27 differs from the edge data table 1500 illustrated in the example of FIG. 24 in that a row of "e10" is added to the edge id field 1510, the active-timestamp field 1520 and the update_active_timestamp field 1530 store "00:25", and the active_count field 1540 stores "1".

In the row of "e9" in the edge id field 1510, the value of the update_active_timestamp field 1530 is changed to "00:25", and the value of the active_count field 1540 is changed to "2".

At this point in time, the number of pieces of metadata to be presented (the number of nodes in a graph generated by the graph generating module 116) is 11, which exceeds the maximum number "10" of pieces of metadata that can be presented. The weekly report meeting 618 and the regular meeting 620 exhibit a low Score 1 (the ascending sorting order of the update_timestamp field 1240), the weekly report meeting 618 and the regular meeting 620 exhibit a low score 2 (the active_count field 1250), and the weekly report meeting 618 and the regular meeting 620 exhibit a high score 3 (the disctence field 1280) (in the case where score 3 is high, presentation of the node is more likely to be deleted). Thus, at this point in time, presentation of the weekly report meeting 618 and the regular meeting 620 is deleted.

Furthermore, as illustrated in an example of FIG. 25, the weekly report meeting 618 and the regular meeting 620 may be presented in a light color or a weekly report meeting (a mark indicating the recent deletion) 1092 and a regular meeting (a mark indicating the recent deletion) 1094 may be presented.

FIG. 28 is an explanatory diagram illustrating an example of node data transition 2800. The node data transition 2800 represents time-series transition of the node data table 1200. The node data transition 2800 contains a node field 2810, an id field 2820, a timestamp field 2830, an update_timestamp field 2840, an active_count field 2860, and a disctence field 2880. The update_timestamp field 2840 includes a (B) field 2842, a (C) field 2844, a (D) field 2846, an (E) field 2848, an (F) field 2850, and a (G) field 2852. The active_count field 2860 includes a (B) field 2862, a (C) field 2864, a (D) field 2866, an (E) field 2868, an (F) field 2870, and a (G) field 2872. The disctence field 2880 includes a (B) field 2882, a (C) field 2884, a (D) field 2886, an (E) field 2888, an (F) field 2890, and a (G) field 2892.

Values in FIGS. 12, 14, 17, 20, 23, and 26 are indicated in the update_timestamp field 2840, the active_count field 2860, and the disctence field 2880, which relate to scores 1, 2, and 3.

As is clear from the node data transition 2800, the weekly report meeting 618 (id=4) and the regular meeting 620 (id=5) are selected as metadata to be deleted at the point in time illustrated in the example of FIG. 25. That is, the weekly report meeting 618 (id=4) and the regular meeting 620 (id=5) are the oldest selected or displayed nodes in the (G) field 2852. The weekly report meeting 618 (id=4) and the regular meeting 620 (id=5) exhibit the smallest value in the (G) field 2872 and the largest value in the (G) field 2892.

Figure 29:
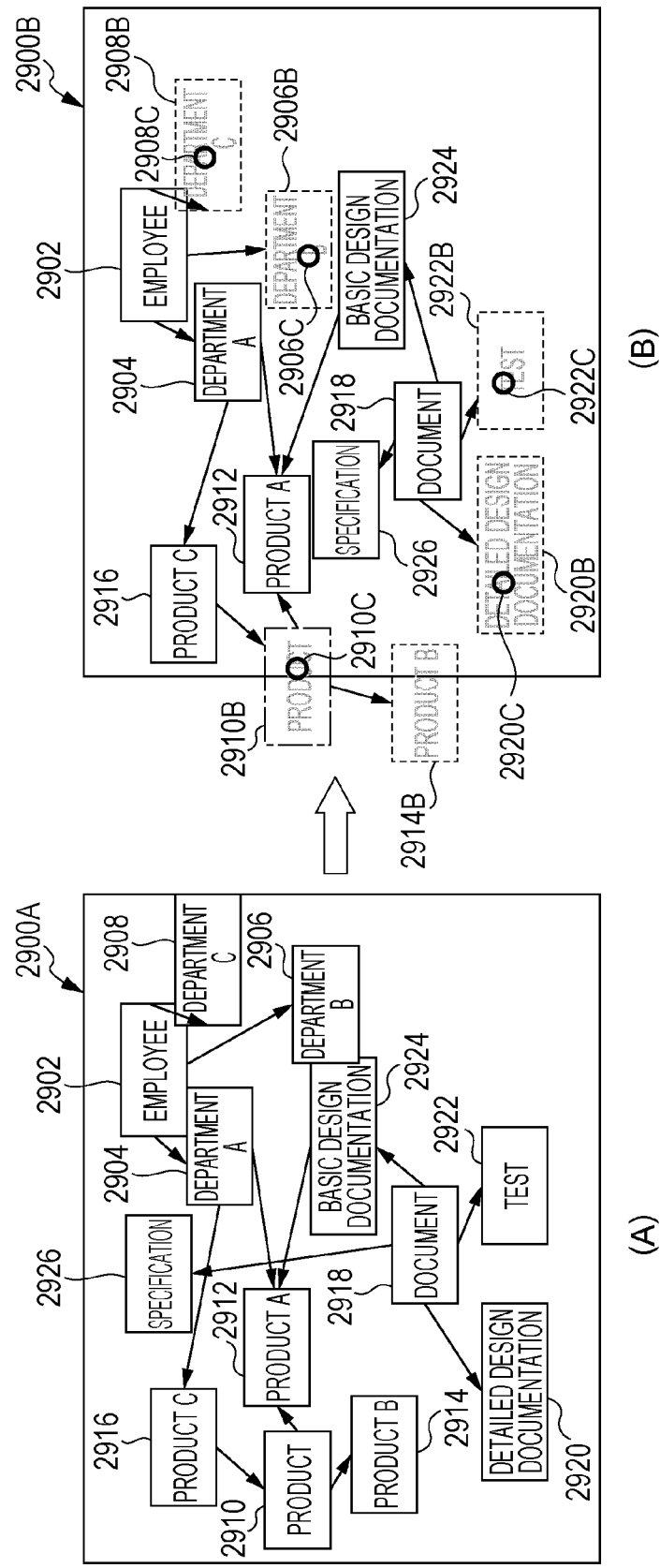
FIG. 29 is an explanatory diagram illustrating examples of a presented screen.

FIG. 29 is an explanatory diagram illustrating examples of a presented screen. The graph generating module 116 generates a metadata graph 2900A, and the metadata presenting module 126 presents a metadata presented screen 2900B. Deleted metadata may be presented in such a manner that the recently deleted metadata (metadata deleted in the past within predetermined steps) is discriminated from metadata deleted prior to the predetermined steps. For example, metadata to which a mark such as a department B (recent deletion) 2906C or the like is added may represent recently deleted metadata, and such a mark might not be added to metadata deleted prior to the deletion of the metadata to which the mark is added.

Figure 30:
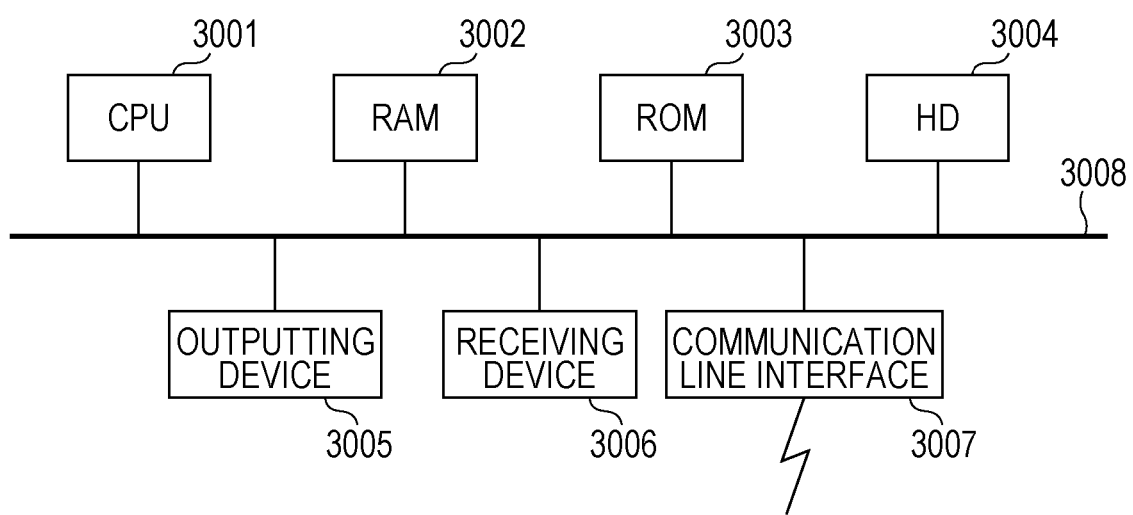
FIG. 30 is a block diagram illustrating an example of the hardware configuration of a computer implementing an exemplary embodiment.

As illustrated in FIG. 30, the hardware configuration of a computer according to an exemplary embodiment that executes a program is that of a general computer, more particularly, a computer that is capable of functioning as a personal computer, a server, or the like. That is, for example, a CPU 3001 is used as a processing unit (arithmetic unit), and a RAM 3002, a ROM 3003, and an HD 3004 are used as storing devices. The HD 3004 may be, for example, a hard disk. The computer includes the CPU 3001 that executes programs such as the document uploading module 104, the metadata receiving module 106, the metadata extracting module 112, the metadata structure processing module 114, the graph generating module 116, the metadata significance calculating module 118, the metadata searching module 120, the search UI module 124, the metadata presenting module 126, the metadata-corresponding document searching module 128, the metadata-corresponding document outputting module 130, and the like, the RAM 3002 that stores the programs and data, the ROM 3003 that stores a program for activating the computer, the HD 3004 serving as an auxiliary storing device, a receiving device 3006 that receives data on the basis of a user operation for a keyboard, a mouse, a touch panel, and the like, an output device 3005 such as a cathode ray tube (CRT), a liquid crystal display, or the like, a communication line interface 3007 that allows connection with a communication network such as a network interface card, and a bus 3008 that allows connection between the elements for data exchange. Plural such computers may be connected via a network.

Among the exemplary embodiments described above, an exemplary embodiment concerning a computer program is implemented by reading the computer program serving as software to a system having the hardware configuration and making the software cooperate with hardware resources.

The hardware configuration illustrated in FIG. 30 is merely an example. The exemplary embodiments may be configured so that the modules explained in the exemplary embodiments can be implemented. For example, some modules may be configured using dedicated hardware (for example, an application specific integrated circuit (ASIC)). Some modules may be arranged in an external system and may be connected via a communication line. In addition, the systems illustrated in FIG. 30 may be connected via communication lines so that cooperative operations can be performed. Furthermore, in particular, the system may be incorporated in a home information appliance, a copying machine, a facsimile machine, a scanner, a printer, a compound machine (an image processing apparatus having two or more of a scanner, a printer, a copying machine, a facsimile machine, etc.), or the like, besides a personal computer.

The techniques explained in related art may be employed as processing details of the individual modules described above.

Furthermore, in the explanation of the foregoing exemplary embodiments, expressions "equal to or greater than", "smaller than or equal to", "greater than", and "smaller than" in comparison with a predetermined value may be "greater than", "smaller than", "equal to or greater than", and "smaller than or equal to" as long as consistency in the combination is maintained.

The program described above may be stored in a recording medium to be supplied or may be supplied by a communication unit. In such a case, for example, the program described above may be regarded as being an invention relating to "a computer readable recording medium in which a program is recorded".

The "computer readable recording medium in which a program is recorded" is a computer readable recording medium in which a program is recorded, where the recording medium is used for installing the program, executing the program, circulating the program, or the like.

The recording medium is, for example, a digital versatile disc-recordable (DVD-R), a DVD-rewritable (DVD-RW), a DVD-RAM, or the like, which is developed by a DVD forum, a DVD+R, a DVD+RW, or the like, which is developed by DVD+RW, a compact disc read-only memory (CD-ROM), a CD-recordable (CD-R), a CD rewritable (CD-RW), a Blu-ray disc (registered trademark), a magneto-optical disk (MO), a flexible disk (FD), a magnetic tape, a hard disk, a read-only memory (ROM), an electrically erasable programmable read-only memory (EEPROM (registered trademark)), a flash memory, a random-access memory (RAM), a secure digital (SD) memory card, or the like.

The program described above or part of the program described above may be recorded in the recording medium to be stored or circulated. In addition, the program may be transmitted via, for example, a local area network (LAN), a metropolitan area network (MAN), a wide area network (WAN), a wired or wireless network used for the Internet, intranet, extranet, or a transmission medium using the combination of some of the above-mentioned networks, or may be carried on a carrier wave.

Furthermore, the program described above may be part of a different program or may be recorded together with a different program in a recording medium. The program may be divided and recorded in plural recording media. The program may be recorded in any form as long as restoration, such as compression or encryption, can be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor, coupled to a memory, that is configured to execute modules comprising:
a presenting unit configured to use the at least one processor to present information related to a search that is being performed on a display;
a selection detection unit configured to use the at least one processor to detect a selection of a et information from the information related to the search that is being performed that is presented by the presenting unit on the display;
a storing unit configured to use the at least one processor to store a plurality of pieces of information and associations between the plurality of pieces of information;
an information extracting unit configured to use the at least one processor to, in response to the selection detection unit detecting the selection of the target information, extract stored information, from the storing unit, that is associated with the selected target information;
a characteristics extracting unit configured to use the at least one processor to extract characteristics relating to the plurality of pieces of information and the associations between the plurality of pieces of information; and
a limiting unit configured to use the at least one processor to, in response to the presenting unit presenting on the display the information extracted by the information extracting unit that is associated with the selected target information and a number of pieces of information to be presented on the display being greater than a predetermined number, limit the information to be presented on the display based on the characteristics extracted by the characteristics extracting unit,
wherein the characteristics extracting unit is configured to extract, as characteristics relating to each of the plurality of pieces of information, a time at which each of the plurality of pieces of information was selected or a time at which information associated with each of the plurality of pieces of information was selected,
wherein the limiting unit is configured to limit the information to be presented on the display by selecting information to be presented on the display by the presenting unit or, when information has already been presented on the display by the presenting unit, by selecting information for which presentation on the display by the presenting unit is to be deleted, in accordance with a comparison between a value based on the characteristics extracted by characteristics extracting unit and a predetermined threshold, and
wherein the presenting unit is configured to present information on the display, using a light color, indicating that the information for which presentation is deleted by the limiting unit was previously presented on the display.

2. The information processing apparatus according to claim 1, wherein the characteristics extracting unit is configured to extract, as characteristics relating to each of the plurality of pieces of information, in a case where a piece of information is selected, a number of pieces of information associated with the selected piece of information or a number of times information associated with the selected piece of information has been selected.

3. The information processing apparatus according to claim 1, wherein the characteristics extracting unit is configured to extract, as characteristics relating to association between a plurality of pieces of information, a value based on a number of times one of selected information and target information that are associated with each other in a path has been selected.

4. A computer-implemented information processing method comprising:
presenting information related to a search that is being performed on a display;
detecting a selection of target information from the information related to the search that is being performed that is presented on the display;
storing, in a storing unit, a plurality of pieces of information and associations between the plurality of pieces of information;
in response to the detecting the selection of the target information, using a processor to extract stored information, from the storing unit, that is associated with the selected target information;
extracting characteristics relating to the plurality of pieces of information and the associations between the plurality of pieces of information; and
in response to the extracted information that is associated with the selected target information being presented on the display and a number of pieces of information to be presented on the display being greater than a predetermined number, limiting the information to be presented on the display based on the extracted characteristics,
wherein the extracting characteristics comprises extracting, as characteristics relating to each of the plurality of pieces of information, a time at which each of the plurality of pieces of information was selected or a time at which information associated with each of the plurality of pieces of information was selected,
wherein the limiting the information to be presented on the display comprises selecting information to be presented on the display or, when information has already been presented on the display, selecting information for which presentation on the display is to be deleted, in accordance with a comparison between a value based on the extracted characteristics and a predetermined threshold, and
wherein the presenting information further comprises presenting information on the display, using a light color, indicating that the information for which presentation is deleted was previously presented on the display.

5. A non-transitory computer readable medium storing a program causing a computer to execute a process for performing information processing, the process comprising:
presenting information related to a search that is being performed on a display;
detecting a selection of target information from the information related to the search that is being performed that is presented on the display;
storing, in a storing unit, a plurality of pieces of information and associations between the plurality of pieces of information, in response to the detecting the selection of the target information, using a processor to extract stored information, from the storing unit, that is associated with the selected target information;

extracting characteristics relating to the plurality of pieces of information and the associations between the plurality of pieces of information; and in response to the extracted information that is associated with the selected target information being presented on the display and a number of pieces of information to be presented on the display being greater than a predetermined number, limiting the information to be presented on the display based on the extracted characteristics, wherein the extracting characteristics comprises extracting, as characteristics relating to each of the plurality of pieces of information, a time at which each of the plurality of pieces of information was selected or a time at which information associated with each of the plurality of pieces of information was selected, wherein the limiting the information to be presented on the display comprises selecting information to be presented on the display or, when information has already been presented on the display, selecting information for which presentation on the display is to be deleted, in accordance with a comparison between a value based on the extracted characteristics and a predetermined threshold, and wherein the presenting information further comprises presenting information on the display, using a light color, indicating that the information for which presentation is deleted was previously presented on the display.

6. The information processing apparatus according to claim 1, wherein the selection detection unit is configured to receive, from a user, the selection of the target information.

\* \* \* \* \*